United States Patent
Ma et al.

(10) Patent No.: US 12,034,520 B2
(45) Date of Patent: Jul. 9, 2024

(54) TECHNIQUES FOR SEQUENTIAL UPLINK TRANSMISSIONS-BASED POSITIONING FOR NONTERRESTRIAL NETWORKS

(71) Applicant: QUALCOMM Incorporated, San Diego, CA (US)

(72) Inventors: Liangping Ma, San Diego, CA (US); Xiao Feng Wang, San Diego, CA (US); Harikumar Krishnamurthy, San Diego, CA (US); Alberto Rico Alvarino, San Diego, CA (US); Ayan Sengupta, San Diego, CA (US); Bharat Shrestha, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 17/556,948

(22) Filed: Dec. 20, 2021

(65) Prior Publication Data

US 2023/0198610 A1    Jun. 22, 2023

(51) Int. Cl.
| | |
|---|---|
| *H04B 7/185* | (2006.01) |
| *G01S 5/02* | (2010.01) |
| *H04L 5/00* | (2006.01) |
| *H04W 56/00* | (2009.01) |

(52) U.S. Cl.
CPC ........ *H04B 7/18513* (2013.01); *G01S 5/0249* (2020.05); *H04L 5/0048* (2013.01); *H04W 56/0045* (2013.01)

(58) Field of Classification Search
CPC ............ H04B 7/18513; H04B 7/18545; G01S 5/0249; G01S 5/0036; G01S 5/0205; H04L 5/0048; H04L 5/0094; H04W 56/0045
See application file for complete search history.

(56) References Cited

U.S. PATENT DOCUMENTS

| | | | |
|---|---|---|---|
| 11,076,266 B2 | 7/2021 | Kim | |
| 2020/0236506 A1* | 7/2020 | Kim | ...................... H04L 5/0048 |
| 2021/0105761 A1 | 4/2021 | Cheng et al. | |
| 2021/0352613 A1* | 11/2021 | Yoon | ...................... H04L 5/0092 |

FOREIGN PATENT DOCUMENTS

| | | |
|---|---|---|
| EP | 3681226 A1 | 7/2020 |
| WO | WO-2020222203 A1 | 11/2020 |
| WO | WO-2021183328 A1 | 9/2021 |

OTHER PUBLICATIONS

International Search Report and Written Opinion—PCT/US2022/080047—ISA/EPO—Feb. 24, 2023.

* cited by examiner

*Primary Examiner* — Farid Seyedvosoghi
(74) *Attorney, Agent, or Firm* — Holland & Hart LLP

(57) ABSTRACT

Methods, systems, and devices for wireless communications are described. A user equipment (UE) may receive control signaling identifying a configuration of a set of uplink slots for the UE to transmit uplink reference signals to a satellite. The UE may transmit, to the satellite, a set of uplink reference signals on the set of uplink slots according to the configuration. The set of uplink reference signals may include sounding reference signals (SRSs), positioning references signals (PRSs), or both. In some implementations, the UE may transmit the set of uplink reference signals in accordance with one or more timing advance values, where the timing advance values are indicated to the satellite by the UE, pre-configured by the satellite, or both. The UE may then, from a network node, an indication of a position of the UE based on the set of uplink reference signals.

28 Claims, 17 Drawing Sheets

TECHNIQUES FOR SEQUENTIAL UPLINK TRANSMISSIONS-BASED POSITIONING FOR NONTERRESTRIAL NETWORKS

FIELD OF TECHNOLOGY

The following relates to wireless communications, including techniques for sequential uplink transmissions-based positioning for non-terrestrial networks (NTNs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems may utilize various positioning techniques in order to identify a position of wireless devices (e.g., UEs) within the wireless communications system. However, current positioning techniques implemented by some terrestrial networks may not be suitable in the context of non-terrestrial networks (NTNs).

SUMMARY

The described techniques relate to improved methods, systems, devices, and apparatuses that support techniques for sequential uplink transmissions-based positioning for non-terrestrial networks (NTNs). Generally, aspects of the present disclosure may support positioning techniques which may be used to determine a position of wireless devices (e.g., user equipments (UEs)) in the context of an NTN. In particular, aspects of the present disclosure enable uplink positioning techniques which utilize timing advance values for uplink signals between a UE and a single network node (e.g., satellite) to determine a position of the UE. For example, a satellite may configure a UE with a set of transmission time intervals (TTIs) (e.g., slots) for transmitting uplink positioning reference signals (PRSs). The set of TTIs may be arranged according to a regular or irregular periodicity in the time domain, and the UE may transmit a PRSs to the satellite within each of the configured TTIs. In this example, the satellite may be configured to identify a position of the UE based on the received PRSs, and may transmit an indication of the demined position to the UE.

A method for wireless communication at a UE is described. The method may include receiving control signaling identifying a configuration of a set of uplink slots for the UE to transmit uplink reference signals to a satellite, transmitting, to the satellite, a set of uplink reference signals on the set of uplink slots according to the configuration, and receiving, from a network node, an indication of a position of the UE based on the set of uplink reference signals.

An apparatus for wireless communication at a UE is described. The apparatus may include a processor, memory coupled with the processor, and instructions stored in the memory. The instructions may be executable by the processor to cause the apparatus to receive control signaling identifying a configuration of a set of uplink slots for the UE to transmit uplink reference signals to a satellite, transmit, to the satellite, a set of uplink reference signals on the set of uplink slots according to the configuration, and receive, from a network node, an indication of a position of the UE based on the set of uplink reference signals.

Another apparatus for wireless communication at a UE is described. The apparatus may include means for receiving control signaling identifying a configuration of a set of uplink slots for the UE to transmit uplink reference signals to a satellite, means for transmitting, to the satellite, a set of uplink reference signals on the set of uplink slots according to the configuration, and means for receiving, from a network node, an indication of a position of the UE based on the set of uplink reference signals.

A non-transitory computer-readable medium storing code for wireless communication at a UE is described. The code may include instructions executable by a processor to receive control signaling identifying a configuration of a set of uplink slots for the UE to transmit uplink reference signals to a satellite, transmit, to the satellite, a set of uplink reference signals on the set of uplink slots according to the configuration, and receive, from a network node, an indication of a position of the UE based on the set of uplink reference signals.

In some examples of the method, apparatuses, and non-transitory computer-readable medium described herein, receiving the control signaling identifying the configuration may include operations, features, means, or instructions for receiving an indication for each slot of the set of uplink slots or a first indication of a starting slot and a period that identify the set of uplink slots.

In some examples of the method, apparatuses, and non-transitory computer-readable medium described herein, transmitting the set of uplink reference signals may include operations, features, means, or instructions for transmitting the set of uplink reference signals on the set of uplink slots according to a set of timing advance values.

Some examples of the method, apparatuses, and non-transitory computer-readable medium described herein may further include operations, features, means, or instructions for receiving, from the network node, an indication that each uplink reference signal of the set of uplink reference signals may be to be transmitted with a same timing advance value, where the set of uplink reference signals may be transmitted on the set of uplink slots in accordance with the same timing advance value.

Some examples of the method, apparatuses, and non-transitory computer-readable medium described herein may further include operations, features, means, or instructions for selecting a timing advance value from a set of candidate timing advance values based on the indication that each uplink reference signal of the set of uplink reference signals may be to be transmitted with the same timing advance value and transmitting, to the network node, an indication of the selected timing advance value, where the set of uplink reference signals may be transmitted on the set of uplink slots in accordance with the selected timing advance value.

Some examples of the method, apparatuses, and non-transitory computer-readable medium described herein may further include operations, features, means, or instructions for transmitting, to the network node, one or more timing advance values corresponding to the set of uplink reference signals transmitted by the UE on the set of uplink slots.

In some examples of the method, apparatuses, and non-transitory computer-readable medium described herein, transmitting the one or more timing advance values may include operations, features, means, or instructions for transmitting an aggregated timing advance value generated from a set of multiple timing advance values for the set of uplink reference signals.

In some examples of the method, apparatuses, and non-transitory computer-readable medium described herein, transmitting the one or more timing advance values may include operations, features, means, or instructions for transmitting a first message that includes an indication of the first one or more timing advance values and transmitting a second message that includes an indication of the second one or more timing advance values.

In some examples of the method, apparatuses, and non-transitory computer-readable medium described herein, the one or more timing advance values include a set of multiple timing advance values, and transmitting the one or more timing advance values may include operations, features, means, or instructions for transmitting a timing advance value selected from the set of multiple timing advance values.

Some examples of the method, apparatuses, and non-transitory computer-readable medium described herein may further include operations, features, means, or instructions for receiving, from the network node, a timing advance value for the set of uplink slots, the set of uplink reference signals transmitted by the UE on the set of uplink slots according to the timing advance value.

In some examples of the method, apparatuses, and non-transitory computer-readable medium described herein, the timing advance value includes a time interval prior to a TTI at the UE, a time interval following a TTI at the UE, or both.

In some examples of the method, apparatuses, and non-transitory computer-readable medium described herein, the timing advance value may be associated with a set of multiple UEs in a cell served by the network node, a beam of the network node, or any combination thereof.

In some examples of the method, apparatuses, and non-transitory computer-readable medium described herein, the timing advance value may be associated with a first set of UEs served by the network node, including the UE, and a second timing advance value may be associated with a second set of UEs served by the network node.

In some examples of the method, apparatuses, and non-transitory computer-readable medium described herein, receiving the control signaling identifying the configuration of the set of uplink slots may include operations, features, means, or instructions for receiving an indication of the set of uplink slots in a system information message, radio resource control (RRC) signaling, a media access control-control element message, a downlink control information message, or any combination thereof.

In some examples of the method, apparatuses, and non-transitory computer-readable medium described herein, the set of uplink reference signals include sounding reference signals (SRSs), PRSs, or any combination thereof.

A method for wireless communication at a network node is described. The method may include transmitting, to a UE, control signaling identifying a configuration of a set of uplink slots for the UE to transmit uplink reference signals to a satellite associated with the network node, receiving, from the UE, a set of uplink reference signals on the set of uplink slots according to the configuration, and transmitting, to the UE, an indication of a position of the UE based on the set of uplink reference signals.

An apparatus for wireless communication at a network node is described. The apparatus may include a processor, memory coupled with the processor, and instructions stored in the memory. The instructions may be executable by the processor to cause the apparatus to transmit, to a UE, control signaling identifying a configuration of a set of uplink slots for the UE to transmit uplink reference signals to a satellite associated with the network node, receive, from the UE, a set of uplink reference signals on the set of uplink slots according to the configuration, and transmit, to the UE, an indication of a position of the UE based on the set of uplink reference signals.

Another apparatus for wireless communication at a network node is described. The apparatus may include means for transmitting, to a UE, control signaling identifying a configuration of a set of uplink slots for the UE to transmit uplink reference signals to a satellite associated with the network node, means for receiving, from the UE, a set of uplink reference signals on the set of uplink slots according to the configuration, and means for transmitting, to the UE, an indication of a position of the UE based on the set of uplink reference signals.

A non-transitory computer-readable medium storing code for wireless communication at a network node is described. The code may include instructions executable by a processor to transmit, to a UE, control signaling identifying a configuration of a set of uplink slots for the UE to transmit uplink reference signals to a satellite associated with the network node, receive, from the UE, a set of uplink reference signals on the set of uplink slots according to the configuration, and transmit, to the UE, an indication of a position of the UE based on the set of uplink reference signals.

In some examples of the method, apparatuses, and non-transitory computer-readable medium described herein, transmitting the control signaling identifying the configuration may include operations, features, means, or instructions for transmitting an indication for each slot of the set of uplink slots or a first indication of a starting slot and a period that identify the set of uplink slots.

In some examples of the method, apparatuses, and non-transitory computer-readable medium described herein, receiving the set of uplink reference signals may include operations, features, means, or instructions for receiving the set of uplink reference signals on the set of uplink slots according to a set of timing advance values.

Some examples of the method, apparatuses, and non-transitory computer-readable medium described herein may further include operations, features, means, or instructions for transmitting, to the UE, an indication that each uplink reference signal of the set of uplink reference signals may be to be transmitted with a same timing advance value, where the set of uplink reference signals may be transmitted on the set of uplink slots in accordance with the same timing advance value.

Some examples of the method, apparatuses, and non-transitory computer-readable medium described herein may further include operations, features, means, or instructions for receiving, from the UE and based on the indication that each uplink reference signal of the set of uplink reference signals may be to be transmitted with the same timing advance value, an indication of a selected timing advance value, where the set of uplink reference signals may be received on the set of uplink slots in accordance with the selected timing advance value.

Some examples of the method, apparatuses, and non-transitory computer-readable medium described herein may further include operations, features, means, or instructions for receiving, from the UE, one or more timing advance values corresponding to the set of uplink reference signals transmitted by the UE on the set of uplink slots.

Some examples of the method, apparatuses, and non-transitory computer-readable medium described herein may further include operations, features, means, or instructions for transmitting, to the UE, a timing advance value for the set of uplink slots, the set of uplink reference signals transmitted by the UE on the set of uplink slots according to the timing advance value.

DETAILED DESCRIPTION

Figure 1:
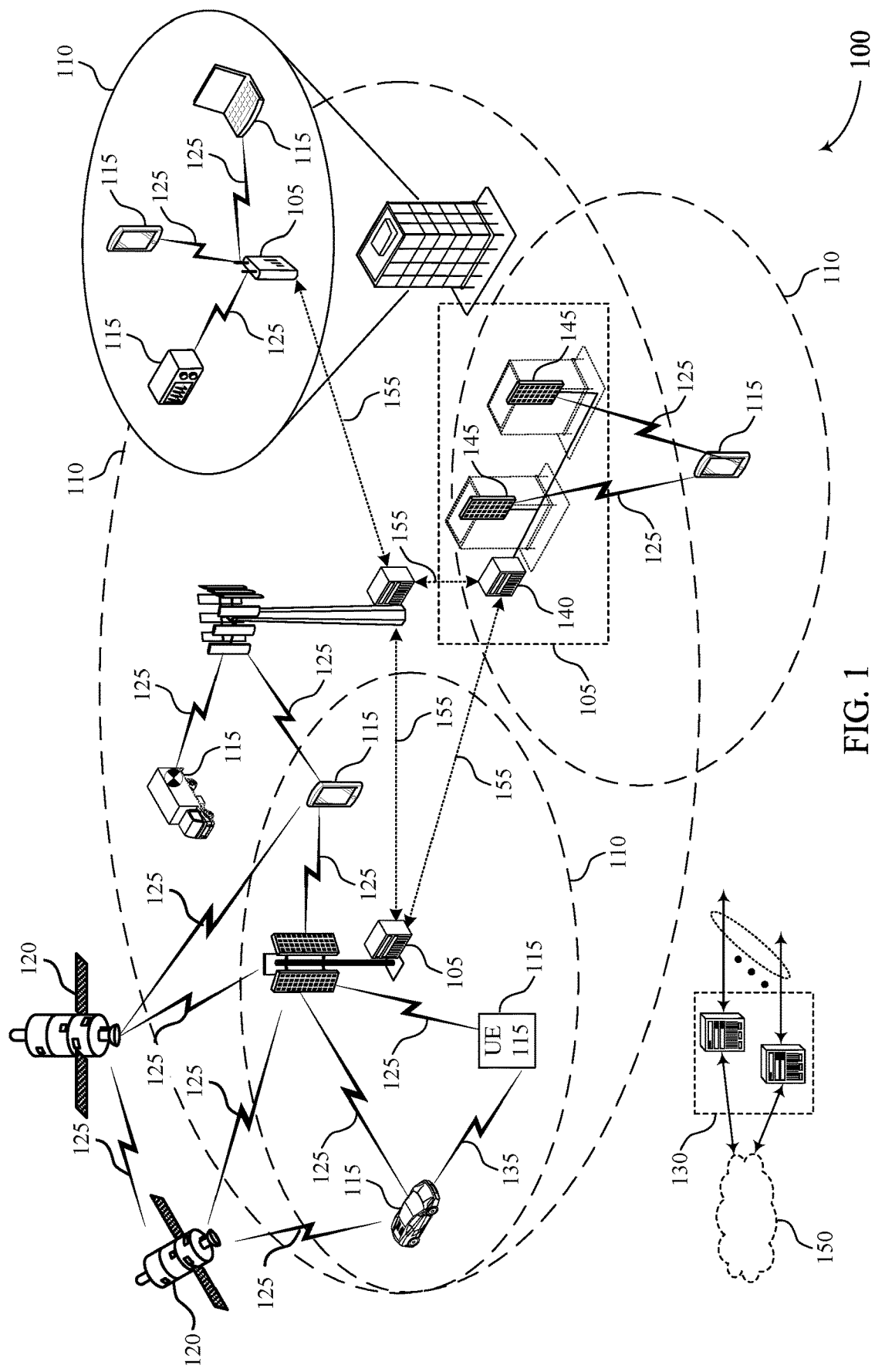
FIG. 1 illustrates an example of a wireless communications system that supports techniques for sequential uplink transmissions-based positioning for non-terrestrial networks (NTNs) in accordance with aspects of the present disclosure.

Wireless communications systems may utilize various positioning techniques in order to identify a position of wireless devices (e.g., user equipments (UEs)) within the wireless communications system. However, current positioning techniques implemented by some terrestrial networks may not be suitable in the context of non-terrestrial networks (NTNs). For example, in accordance with conventional uplink positioning techniques, a UE may transmit uplink signals to multiple base stations (e.g., three base stations), which may enable the network to triangulate a position of the UE based on the uplink signals. However, such uplink positioning techniques may not be suitable in the context of NTNs, as a UE may not be able to simultaneously communicate with multiple satellites. Additionally, downlink positioning techniques used by some wireless communications systems may be based on a time-of-arrival of downlink signals received at a UE. However, in the context of NTNs, large propagation times between satellites and UEs may result in accuracy problems due to potentially large clock drift rates at the UEs, rendering downlink positioning techniques unsuitable for some NTNs.

Accordingly, techniques described herein are directed to positioning techniques which may be used to determine a position of wireless devices (e.g., UEs) in the context of an NTN. In particular, techniques described herein may implement uplink positioning techniques which utilize timing advance values for uplink signals between a UE and a single network node (e.g., satellite) to determine a position of the UE. For example, a satellite may configure a UE with a set of transmission time intervals (TTIs) (e.g., slots) for transmitting uplink reference signals (e.g., positioning reference signals (PRSs), sounding reference signals (SRSs)). The set of TTIs may be arranged according to a regular or irregular periodicity in the time domain, and the UE may transmit a PRSs to the satellite within each of the configured TTIs. In this example, the satellite may be configured to identify a position of the UE based on the received PRSs, and may transmit an indication of the demined position to the UE.

In some aspects, PRSs transmitted to the satellite within the configured TTIs may be transmitted in accordance with one or more timing advance values. Timing advance values may account for propagation delay of the PRSs between the UE and the satellite such that the PRSs are received at the satellite within the scheduled/configured TTIs. For example, the UE may transmit a PRS 120 ms in advance (e.g., timing advance=120 ms) such that the PRS is received at the satellite within the scheduled TTI. In some aspects, each PRS transmitted by the UE within the scheduled TTIs may be transmitted in accordance with a respective timing advance value. In such cases, the UE may report the respective timing advance values to the satellite to enable the satellite to determine the position of the UE. Additionally, or alternatively, the satellite may indicate one or more timing advance values which are to be used for the PRSs, such that the timing advance values are known at the satellite 120 in advance to facilitate positional determinations.

Aspects of the disclosure are initially described in the context of wireless communications systems. Aspects of the disclosure are additionally described in the context of an example resource configuration and an example process flow. Aspects of the disclosure are further illustrated by and described with reference to apparatus diagrams, system diagrams, and flowcharts that relate to techniques for sequential uplink transmissions-based positioning for NTNs.

FIG. 1 illustrates an example of a wireless communications system 100 that supports techniques for sequential uplink transmissions-based positioning for NTNs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 155 (e.g., via an S1, N2, N3, or other interface). The base stations 105 may communicate with one another over the backhaul links 155 (e.g., via an X2, Xn, or other interface) either directly (e.g., directly between base stations 105), or indirectly (e.g., via core network 130), or both. In some examples, the backhaul links 155 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105, satellite 120, or both, may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Wireless communications system 100 may also include one or more satellites 120. A satellite 120 may communicate with base stations 105, which may be referred to as gateways in an NTN, and UEs 115, which may include other high altitude or terrestrial communications devices. In some examples, a satellite 120 itself may be an example of a base station 105. A satellite 120 may be any suitable type of communication satellite configured to relay or otherwise support communications between different devices in the wireless communications system 100. A satellite 120 may be an example of a space satellite, a balloon, a dirigible, an airplane, a drone, an unmanned aerial vehicle, or other vehicle which may support communications from a generally non-terrestrial, overhead, or elevated position. In some examples, a satellite 120 may be in a geosynchronous or geostationary earth orbit, a low earth orbit, or a medium earth orbit. A satellite 120 may be a multi-beam satellite configured to provide service for multiple service beam coverage areas in a configured geographical service area. The satellite 120 may be any distance away from the surface of the earth or other reference surface.

In some examples, a cell may be provided or established by a satellite 120 as part of an NTN. A satellite 120 may, in some cases, perform the functions of a base station 105, act as a bent-pipe satellite, or act as a regenerative satellite, or a combination thereof. In some examples, a satellite 120 may be an example of a smart satellite, or a satellite with intelligence or other communications processing capability. For example, a smart satellite may be configured to perform more functions than a regenerative satellite (e.g., may be configured to perform particular algorithms beyond those used in regenerative satellites, to be reprogrammed). In a bent-pipe transponder configuration, a satellite 120 may be configured to receive signals from ground stations (e.g., gateways, base stations 105, a core network 130) and transmit those signals to different ground stations or terminals (e.g., UEs 115, base stations 105). In some cases, a satellite 120 supporting a bent-pipe transponder configuration may amplify signals or shift from uplink frequencies to downlink frequencies. In some examples, a satellite 120 supporting a regenerative transponder configuration may relay signals like a bent-pipe transponder configuration, but may also use on-board processing to perform other functions. Examples of these other functions may include demodulating a received signal, decoding a received signal, re-encoding a signal to be transmitted, modulating the signal to be transmitted, or a combination thereof. In some examples, a satellite 120 supporting a bent pipe transponder configuration or regenerative transponder configuration may receive a signal from a base station 105 and may relay the signal to a UE 115 or base station 105, or vice-versa.

The UEs 115, base stations 105, and satellites 120 of the wireless communications system 100 may be configured to support positioning techniques which may be used to determine a position of wireless devices (e.g., UEs 115) in the context of an NTN. In particular, the wireless communications system 100 (e.g., NTN) may be configured to implement uplink positioning techniques which utilize timing advance values for uplink signals between a UE 115 and a single network node (e.g., satellite 120) to determine a position of the UE 115. The positioning techniques implemented by the wireless communications system 100 may resolve many of the shortcomings exhibited by some conventional positioning techniques, and may enable a position of a UE 115 to be determined in the context of an NTN.

For example, a satellite 120 of the wireless communications system 100 may configure a UE 115 with a set of TTIs (e.g., slots) for transmitting uplink PRSs. The set of TTIs may be arranged according to a regular or irregular periodicity in the time domain, and the UE 115 may transmit a PRSs to the satellite 120 within each of the configured TTIs. In this regard, the UE 115 may transmit multiple PRSs to the satellite 120 at multiple points in time. In this example, the satellite 120 may be configured to identify a position of the UE 115 based on the received PRSs. In particular, the satellite 120 may determine the position of the UE 115 based on timing advance values and receive times at the satellite 120 for each of the respective PRSs. Upon determining a position of the UE 115, the satellite 120 may transmit an indication of the demined position to the UE 115.

In some aspects, PRSs transmitted to the satellite 120 within the configured TTIs may be transmitted in accordance with one or more timing advance values. Timing advance values may account for propagation delay of the PRSs between the UE 115 and the satellite 120 such that the PRSs are received at the satellite 120 within the scheduled/configured TTIs. For example, the UE 115 may transmit a PRS 120 ms in advance (e.g., timing advance=120 ms) such that the PRS is received at the satellite 120 within the scheduled TTI. In some aspects, each PRS transmitted by the UE 115 within the scheduled TTIs may be transmitted in accordance with a respective timing advance value. In such cases, the UE 115 may report the respective timing advance values to the satellite 120 to enable the satellite 120 to determine the position of the UE 115. Additionally, or alternatively, the satellite 120 may indicate one or more timing advance values which are to be used for the PRSs, such that the timing advance values are known at the satellite 120 in advance to facilitate positional determinations. Accordingly, receive times of PRSs received at the satellite 120, in addition to the indicated/configured timing advance values, may enable the satellite 120 to determine a position of the UE 115.

Techniques described herein may enable a geographical position of a UE 115 to be determined in the context of an NTN. In particular, techniques described herein may utilize timing advance values for PRSs transmitted from a UE 115 to a single satellite 120 to enable a geographical position of the UE 115 to be determined. Techniques described herein may enable positional determinations for a UE 115 to be made without relying on an internal clock at the UE 115, and in cases where the UE 115 is communicatively coupled to only a single satellite 120 at a time. As such, aspects of the present disclosure may enable improved positional determinations in the context of NTNs, thereby facilitating positional applications (e.g., GPS), and enabling more efficient and reliable wireless communications.

Figure 2:
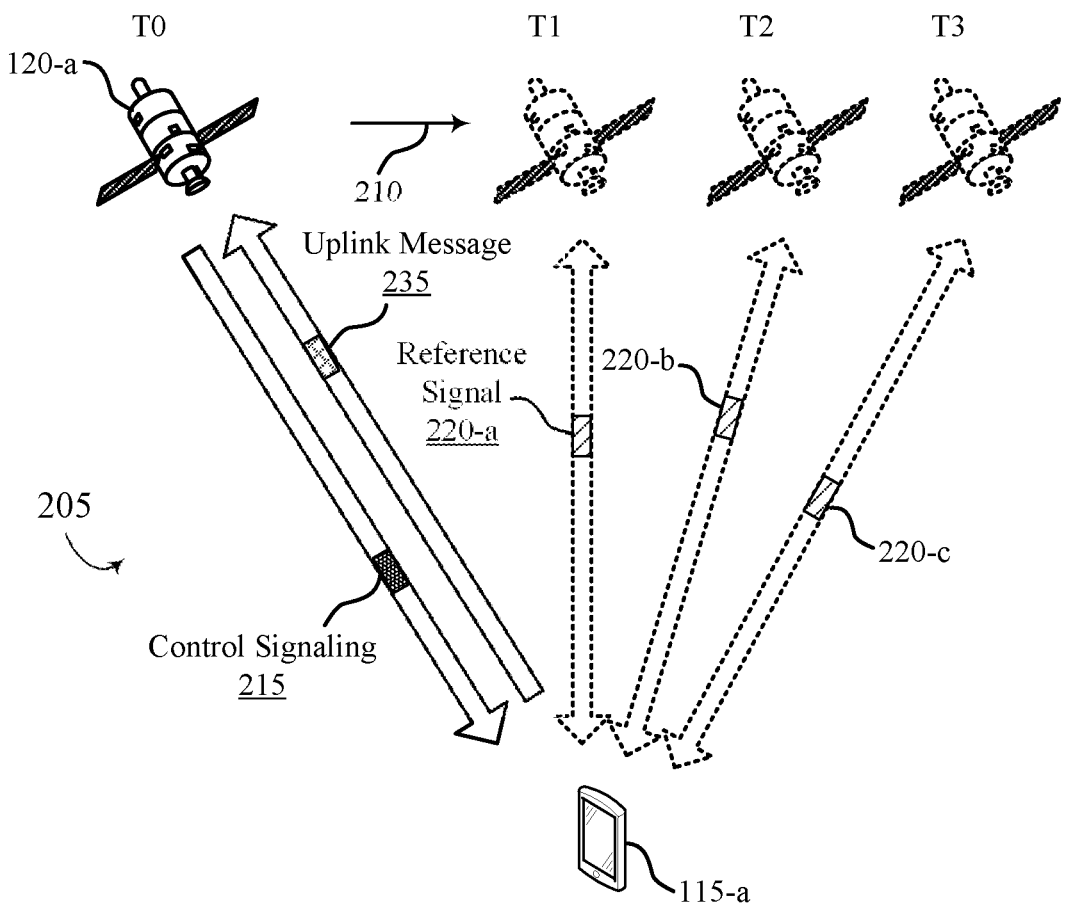
FIG. 2 illustrates an example of a wireless communications system that supports techniques for sequential uplink transmissions-based positioning for NTNs in accordance with aspects of the present disclosure.
Figure 2:
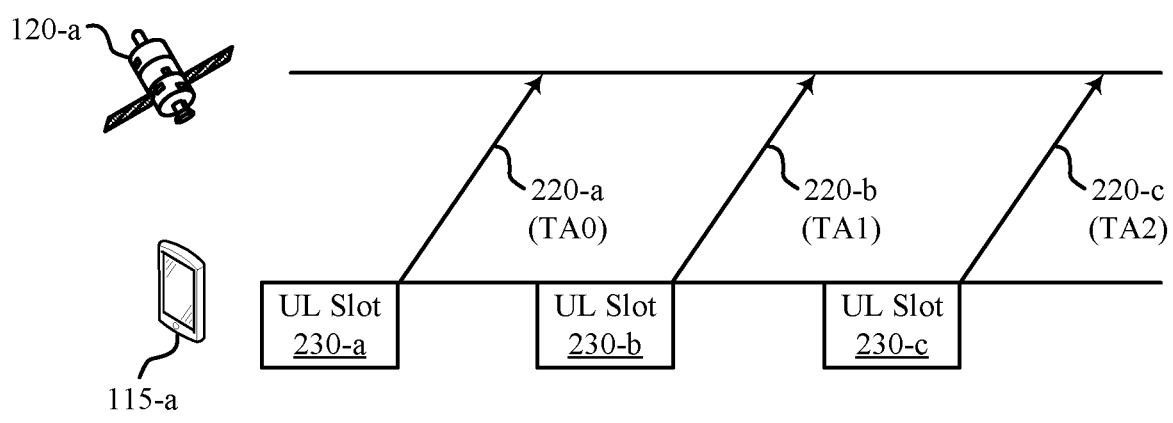

FIG. 2 illustrates an example of a wireless communications system 200 that supports techniques for sequential uplink transmissions-based positioning for NTNs in accordance with aspects of the present disclosure. In some examples, the wireless communications system 200 may implement aspects of the wireless communications system 100. For example, wireless communications system 200 may support techniques for determining a position of a UE 115-a in the context of an NTN, as described with reference to FIG. 1.

The wireless communications system 200 may include a UE 115-a and a satellite 120-a, which may be examples of UEs 115 and satellites 120 as described in FIG. 1. In this regard, the wireless communications system 200 may include an example of an NTN. The UE 115-a may communicate with the satellite 120-a using one or more communication links. For example, the UE 115-a may communicate with the satellite 120-a via a communication link 205. In some cases, the communication link 205 may include an example of an access link (e.g., Uu link). The communication link 205 may include a bi-directional link that can include both uplink and downlink communication. For example, the UE 115-a may transmit uplink transmissions, such as uplink control signals or uplink data signals, to the satellite 120-a via communication link 205, and the satellite 120-a may transmit downlink transmissions, such as downlink control signals or downlink data signals, to the UE 115-a via the communication link 205.

The satellite 120-a may be configured to support communications over geographic coverage areas. The geographic coverage areas may be located at a relatively fixed location (e.g., when the satellite 120 is in a geostationary orbit or otherwise generally fixed overhead location), or may move or sweep across locations (e.g., as a moving geographic coverage area, such as when the satellite 120-a is in a low-earth orbit or medium earth orbit, or is otherwise moving overhead). For example, as shown in FIG. 2, the satellite 120-a may move along a direction of movement 210 such that the satellite 120-a is located at a first position at a first time (T1), a second position at a second time (T2), a third position at a third time (T3), and a fourth position at a fourth time (T4). In such cases, the coverage area of the satellite 120-a may move relative to Earth (and the UE 115-a) based on the direction of movement 210.

In some examples, the satellite 120-a may be an example of, or may be configured to operate as, a smart satellite, where the satellite 120-a supports a capability for processing communications associated with the respective coverage areas (e.g., uplink communications, downlink communications, or both). In examples where the satellite 120-a is configured to operate as a smart satellite, the satellites 120-a may be an example of a base station 105, as described herein (e.g., where the satellite 120-a operates as a gNB or other type of base station), and the satellite 120-a may or may not communicate with a core network via a gateway.

In some examples, the satellite 120-a may be an example of, or may be configured to operate as, a bent-pipe transponder or regenerative transponder, where the satellite 120-a operates as a relay between a gateway and one or more devices within the respective geographic coverage area of the satellite 120-a (e.g., relaying signals received from devices within the geographic coverage area over gateway communication links, relaying signals received from the gateway over gateway communication links as transmissions to devices in the geographic coverage area).

The satellite 120-a may be in an orbit, such as low earth orbit, medium earth orbit, geostationary earth orbit, or other non-geostationary earth orbit. In any of these examples, the satellite 120-a may be many thousands of kilometers from Earth, and therefore may be thousands of kilometers from the UE 115-a. Each transmission between the satellite 120-a and the UE 115-a may therefore travel from Earth the distance to the satellite 120-a and back to Earth.

As noted previously herein, wireless communications systems may utilize various positioning techniques in order to identify a position of wireless devices (e.g., UEs) within the wireless communications system. Some wireless communications systems may utilize uplink positioning techniques, downlink positioning techniques, or both, which determine positions of wireless devices using uplink and downlink signals, respectively. However, current positioning techniques implemented by some terrestrial networks may not be suitable in the context of NTNs.

For example, in accordance with conventional uplink positioning techniques, a UE 115 may transmit uplink signals to multiple base stations 105 and/or satellites 120 (e.g., three base stations 105, three satellites 120), which may enable the network to triangulate a position of the UE 115 based on the uplink signals. However, such uplink positioning techniques may not be suitable in the context of NTNs. In particular, such uplink positioning techniques may require visibility of multiple satellites 120 at the UE 115, which may be rare or even impossible with some NTNs, particularly for the initial deployment of an NTN in which the satellite constellation may be sparse.

Additionally, downlink positioning techniques used by some wireless communications systems may be based on a time-of-arrival of downlink signals received at a UE 115. However, such downlink transmission-based techniques may suffer from accuracy problems due to the potentially large clock drift rate at the UE 115 relative to the network. Moreover, large propagation times of communications between satellites 120 and UEs 115 may further exacerbate clock drift rates at the UEs 115, leading to inaccurate positional determinations and rendering downlink positioning techniques unsuitable for some NTNs.

Accordingly, the UE 115-a and the satellite 120-a of the wireless communications system 200 may support positioning techniques which may be used to determine a position of the UE 115-a. In particular, the wireless communications system 200 may be configured to implement uplink positioning techniques which utilize timing advance values for sequential uplink transmissions between the UE 115-a and the satellite 120-a to determine a position of the UE 115-a. In such cases, techniques described herein may utilize timing advance values and time-of-arrivals of PRSs received at the satellite 120-a in order to determine a position of the UE 115-a. Timing advance values for sequential PRSs transmitted from the UE 115-a to the satellite 120-a may be reported by the UE 115-a, pre-configured by the satellite 120-a, or both.

For example, some aspects, the network may configure the UE 115-a with a set of uplink TTIs (e.g., uplink slots 230) which may be used by the UE 115-a to transmit uplink reference signals 220 to the satellite 120-a, where the uplink reference signals 220 may be used for the purpose of timing estimation and a determination of the position of the UE 115-a. For instance, as shown in FIG. 2, the UE 115-a may receive control signaling 215 which identifies a configuration of a set of uplink slots 230 (e.g., first uplink slot 230-a, second uplink slot 230-b, third uplink slot 230-c) which will be used to transmit uplink reference signals 220 (e.g., SRSs, PRSs) for timing estimation and positional determinations. The control signaling 215 may include a system information message (e.g., system information block (SIB)), an RRC message, a MAC control element (MAC-CE) message, a downlink control information (DCI) message, or any combination thereof. Moreover, the control signaling 215 may be received from the satellite 120-a (as shown in FIG. 2), another network node (e.g., base station 105, another satellite 120) associated with the satellite 120-a, or any combination thereof.

In some aspects, the configuration indicated via the control signaling 215 may indicate a slot or slot pattern associated with a set of uplink TTIs (e.g., uplink slots 230) which will be used to transmit uplink reference signals 220. For example, the configuration may indicate position in the time domain of each uplink slot 230 which will be used to transmit uplink reference signals 220. In additional or alternative implementations, the configuration may indicate a starting slot (e.g., slot of first uplink slot 230-a) and a periodicity that identify the set of uplink slots 230, where the periodicity may include every K slots.

Configurations of sets of uplink slots 230 used for uplink reference signals 220 may be further shown and described with reference to FIG. 3.

Figure 3:
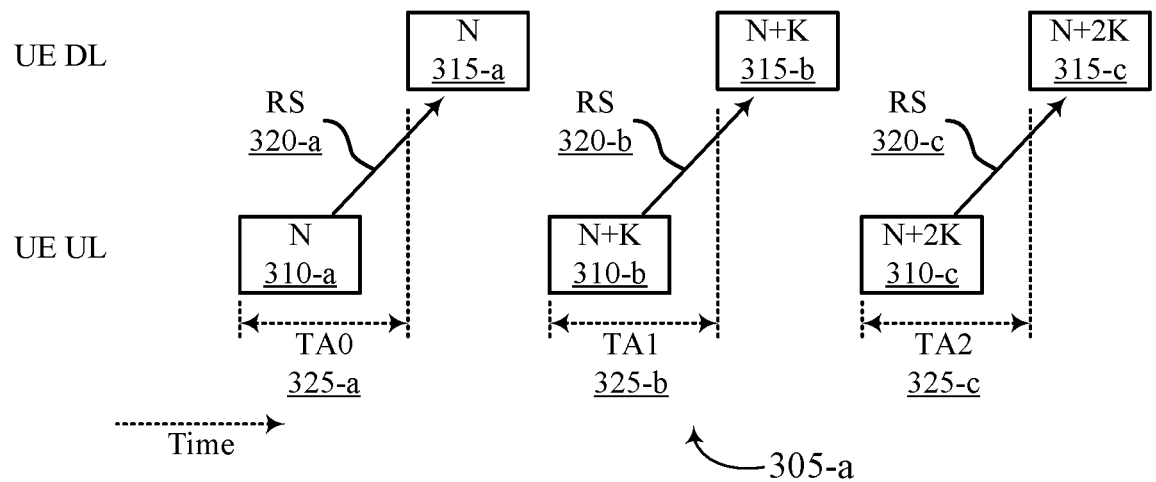
FIG. 3 illustrates an example of a resource configuration that supports techniques for sequential uplink transmissions-based positioning for NTNs in accordance with aspects of the present disclosure.
Figure 3:
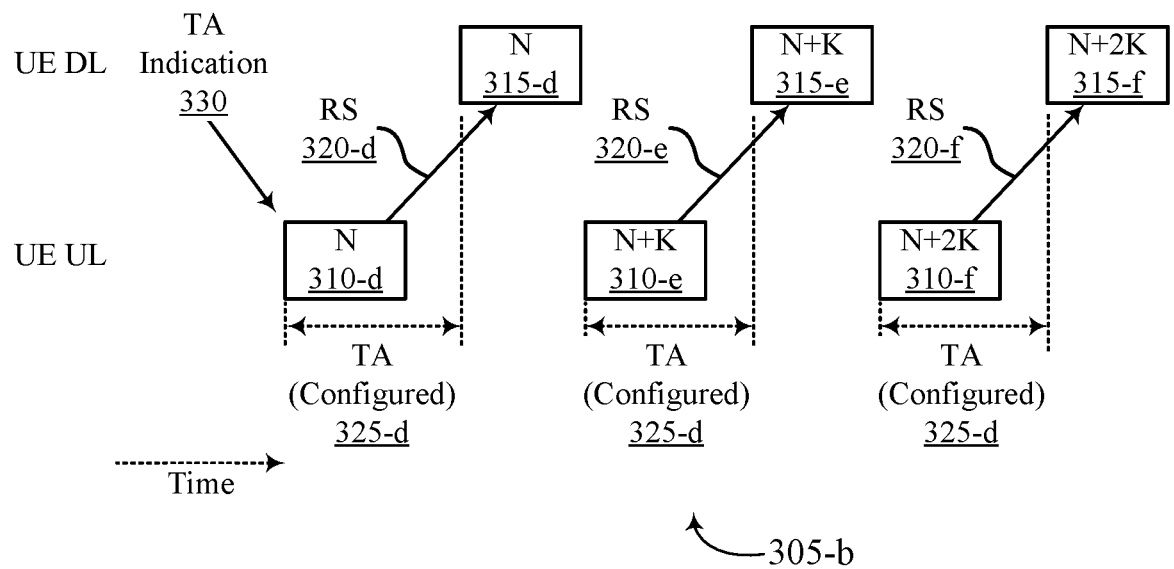

FIG. 3 illustrates an example of a resource configuration 300 that supports techniques for sequential uplink transmissions-based positioning for NTNs in accordance with aspects of the present disclosure. Aspects of the resource configuration 300 may implement, or be implemented by, aspects of the wireless communications system 100, the wireless communications system 200, or both.

The resource configuration 300 illustrates a first resource allocation scheme 305-a and a second resource allocation scheme 305-b. As noted previously herein, a UE 115 may receive control signaling (e.g., control signaling 215 illustrated in FIG. 2) which indicates a configuration for a set of uplink slots for the UE 115 to transmit uplink reference signals. For example, as shown in the first resource allocation scheme 305-a, the UE 115 may receive a configuration for a set of uplink slots 310 (e.g., first uplink slot 310-a, second uplink slot 310-b, third uplink slot 310-c) which will be used to transmit uplink reference signals 320. Similarly, referring to the second resource allocation scheme 305-b, the UE 115 may receive a configuration for a set of uplink slots 310 (e.g., first uplink slot 310-d, second uplink slot 310-e, third uplink slot 310-f) which will be used to transmit uplink reference signals 320.

Referring to the first resource allocation scheme 305-a, the configuration may indicate a position of each uplink slot 310-a, 310-b, 310-c in the time domain. In other cases, the configuration may indicate a starting slot (e.g., first uplink slot 310-c, or some other reference slot) and a period (e.g., periodicity) of the uplink slots 310. For instance, as shown in the first resource allocation scheme 305-a, the configuration may indicate a starting slot N (corresponding to the first uplink slot 310-a), and a period K, such that the second uplink slot 310-b is located at slot N+K, the second uplink slot 310-c is located at slot N+2K, and the like.

As may be seen in the resource configuration 300, the sets of uplink slots 310 at the UE 115 may be offset relative to sets of downlink slots 315 at the UE 115. Such offsets may be based on a propagation delay between the UE 115 and the satellite 120. In this regard, due to the propagation delay between the UE 115 and the satellite 120, uplink transmissions (e.g., uplink references signals 320) transmitted by the UE 115 to the satellite 120 may be transmitted with some timing advance value 325 in order to be received in the corresponding downlink slot 315. For example, as shown in the first resource allocation scheme 305-a, in order for an uplink reference signal 320-a to be received at the satellite 120 within a first downlink slot 315-a, the uplink reference signal 320-a may be transmitted within the first uplink slot 310-a which is offset relative to the first downlink slot 315-a by a timing advance value 325-a.

Reference will again be made to the wireless communications system 200 illustrated in FIG. 2.

In some aspects, the UE 115-a may transmit a set of uplink reference signals 220 based on (e.g., in accordance with) the configuration of the set of uplink slots 230. In particular, the UE 115-a may transmit uplink reference signals 220 within each of the uplink slots 230 configured via the control signaling 215. In this regard, the UE 115-a may transmit multiple uplink reference signals 220 to the satellite 120-a at different times. For example, the UE 115-a may transmit a first uplink reference signal 220-a to the satellite 120-a within the first uplink slot 230-a, a second uplink reference signal 220-b to the satellite 120-a the second uplink slot 230-b, and a third uplink reference signal 220-c to the satellite 120-a within the third uplink slot 230-c. As shown in FIG. 2, due to the direction of movement 210, the satellite 120-a may receive each of the respective uplink reference signals 220-a, 220-b, 220-c at a different position (and a different time). For example, the satellite 120-a may receive the first uplink reference signal 220-a, the second uplink reference signal 220-b, and the third uplink reference signal 220-c at times T1, T2, and T3, respectively.

In some implementations, the UE 115-a may utilize separate timing advance values for each of the respective uplink reference signals 220 based on a timing difference between uplink and downlink slots. Timing advance values may refer to a difference between a downlink frame and an uplink frame at the UE 115-a with the same frame number. In this regard, timing advance values may refer to a time difference such that an uplink transmission in an uplink slot n at the UE 115-a will arrive at the base station 120-a within uplink slot n at the satellite 120-a. For example, referring again to FIG. 3, the UE 115-a may utilize separate timing advance values 325 based on a relative timing difference between the uplink slots 310 (e.g., uplink slots 230) and the downlink slots 315 at the UE 115-a.

For example, as shown in FIG. 2, the UE 115-a may transmit the first uplink reference signal 220-a, the second uplink reference signal 220-b, and the third uplink reference signal 220-c based on (e.g., in accordance with) a first timing advance value (TA0), a second timing advance value (TA1), and a third timing advance value (TA2), respectively. In such cases, the timing advance values may be different to account for the changing time difference (e.g., changing propagation delay) between uplink and downlink slots at the UE 115-a.

By way of another example, as shown in the first resource allocation scheme 305-a illustrated in FIG. 3, the UE 115 may transmit the first uplink reference signal 320-a, the second uplink reference signal 320-b, and the third uplink reference signal 320-c based on (e.g., in accordance with) a first timing advance value 325-a (TA0), a second timing advance value 325-b (TA1), and a third timing advance value 325-c (TA2), respectively. In such cases, the timing advance values may be different to account for the changing time difference (e.g., changing propagation delay) between uplink slots 310 and downlink slots 315 at the UE 115.

In cases where the UE 115-a utilizes separate timing advance values for the respective uplink reference signals 220, the UE 115-a may be configured to report the timing advance values (e.g., accumulative timing advance values) associated with each uplink reference signal 220 in separate transmissions, aggregated within a single transmission, or both. In other words, the timing advance reports transmitted by the UE 115-a may be included within separate transmissions and/or aggregated within a single transmission. For example, in some implementations, the UE 115-a may transmit one or more uplink messages 235 which indicate the timing advance values which are/will be used for the uplink reference signals 220-a, 220-b, 220-c. Additionally, or alternatively, the respective timing advance values may be indicated via the respective uplink reference signals 220-a. For example, in some cases, the first uplink reference signal 220-a may indicate the first timing advance value, and the second uplink reference signal 220-b may indicate the second timing advance value.

In additional or alternative implementations, the network (e.g., satellite 120-a) may configure the UE 115-a to use a same timing advance value for each of the uplink reference signals 220. For example, in some cases, the satellite 120-a may expressly indicate (e.g., via the control signaling 215 or other downlink signaling) the timing advance value which will be used for each of the respective uplink reference signals 220-a, 220-b, 220-c. By way of another example, the satellite 120-a may indicate that the UE 115-a is to use a same timing advance value for each of the uplink reference signals 220, but may not expressly indicate a value of the timing advance value. In such cases, the UE 115-a may select a timing advance value which will be used for each of the uplink reference signals 220 (e.g., from set of candidate timing advance values), and may report the selected timing advance value to the satellite 120-a. In cases where a same/common timing advance value is to be used for each uplink reference signal 220, the UE 115-a may report only the single timing advance value (e.g., via the one or more uplink messages 235, via the reference signal(s) 220).

In some implementations, the UE 115-a may be configured to transmit sequential uplink transmissions (e.g., sequential uplink reference signals 220) with a pre-configured timing advance value. For example, in some implementations, the network may indicate (e.g., via control signaling 215, via other downlink signaling) a pre-configured timing advance value which will be used for each of the uplink reference signals 220. By way of another example, referring to the second resource allocation scheme 305-b illustrated in FIG. 3, the UE 115 may receive an indication 330 of a timing advance value 325-d, and may therefore be configured to transmit each of the uplink reference signals 320-d, 320-e, 320-f based on (e.g., in accordance with) the configured timing advance value 325-d.

The granularity of the pre-configured timing advance value 325-d (e.g., granularity of the delay) may be $T_C=1/(480,000*4,096)$ seconds, multiples of $T_C$, a quantity of slots, a quantity of subframes, or any combination thereof. Moreover, in some aspects, the pre-configured timing advance value 325-d may be positive (e.g., positive timing advance), negative (e.g., negative timing advance), or zero. For the purposes of the present disclosure, the term "positive timing advance" may refer to timing advance values 325 which define a time interval prior to some slot. In other words, referring to FIG. 3, positive timing advance values 325 may define a duration of time prior to downlink slots 315 (or some other slot). For instance, the first timing advance value 325-d may define a time interval prior to the first downlink slot 315-d. Comparatively, the term "negative timing advance" may refer to timing advance values 325 which define a time interval subsequent to some slot/TTI. In other words, referring to FIG. 3, negative timing advance values 325 may define a duration of time after downlink slots 315 (or some other slot/TTI). For instance, a negative timing advance value 325-d may define a time interval following the first downlink slot 315-d in which an uplink reference signal 320 is to be transmitted.

In some aspects, a pre-configured timing advance value 325-d may be the same for all UEs 115 associated with a cell supported by the satellite 120-a and/or all UEs 115 associated with a beam at the satellite 120-a (e.g., based on timing advance values reported by one or more UEs 115 within the wireless communications system 200). In additional or alternative implementations, pre-configured timing advance values 325-d may be UE-specific, and may potentially be different for different UEs 115 (e.g., based on timing advance values reported by each UE 115).

In some cases, the use of a pre-configured timing advance value 325-d may reduce control signaling used for reporting high-precision timing advance values which will be used for each respective uplink reference signal 220, which may therefore save bits and network overhead. However, the use of pre-configured timing advance values may suffer some drawbacks, as uplink transmissions from different UEs 115 may not align at the satellite 120-a. Moreover, the use of pre-configured timing advance values may increase network-side complexity, and may require increased quantities of resources for the uplink reference signals 220 transmitted by the respective UEs 115.

In each of the examples described above, the satellite 120-a and/or other network node (e.g., base station 105) may be configured to identify a position of the UE 115-a based on the received uplink reference signals 220. In particular, the satellite 120-a may be configured to determine a position of the UE 115-a based on the timing advance value(s) for each respective uplink reference signal 220, time-of-arrivals of each of the respective uplink reference signals 220, a position of the satellite 120-a at a time the satellite 120-a received each respective uplink reference signal 220, or any combination thereof.

For example, the satellite 120-a may be configured to estimate a distance between the satellite 120-a and the UE 115-a at each of T1, T2, and T3 based on the received reference signals 220-a, 220-b, 220-c, the timing advance values, and a position of the satellite 120-a at each of T1, T2, and T3. In this example, the satellite 120-a may determine/estimate a position of the UE 115-a based on the estimated distances between the satellite 120-a and the UE 115-a at each of times T1, T2, and T3.

Upon determining a position of the UE 115-a based on the received uplink reference signals 220, the satellite 120-a may transmit an indication of the determined position to the UE 115-a. For example, in some cases, the satellite 120-a may transmit a downlink message to the UE 115-a, where the downlink message includes an indication of the position of the UE 115-a. In other cases, the indicated position of the UE 115-a may be relayed from the satellite 120-a to the UE 115-a via one or more additional network nodes (e.g., other satellite(s) 120, base station(s) 105).

Techniques described herein may enable a geographical position of the UE 115-a to be determined in the context of an NTN. In particular, techniques described herein may utilize timing advance values for uplink reference signals 220 (e.g., PRSs, SRSs) transmitted from the UE 115-a to the satellite 120-a to enable a geographical position of the UE 115-a to be determined. Techniques described herein may enable positional determinations for the UE 115-a to be made without relying on an internal clock at the UE 115-a, and in cases where the UE 115-a is communicatively coupled to only a single satellite 120 (e.g., satellite 120-a) at a time. As such, aspects of the present disclosure may enable improved positional determinations in the context of NTNs, thereby facilitating positional applications (e.g., GPS), and enabling more efficient and reliable wireless communications.

Figure 4:
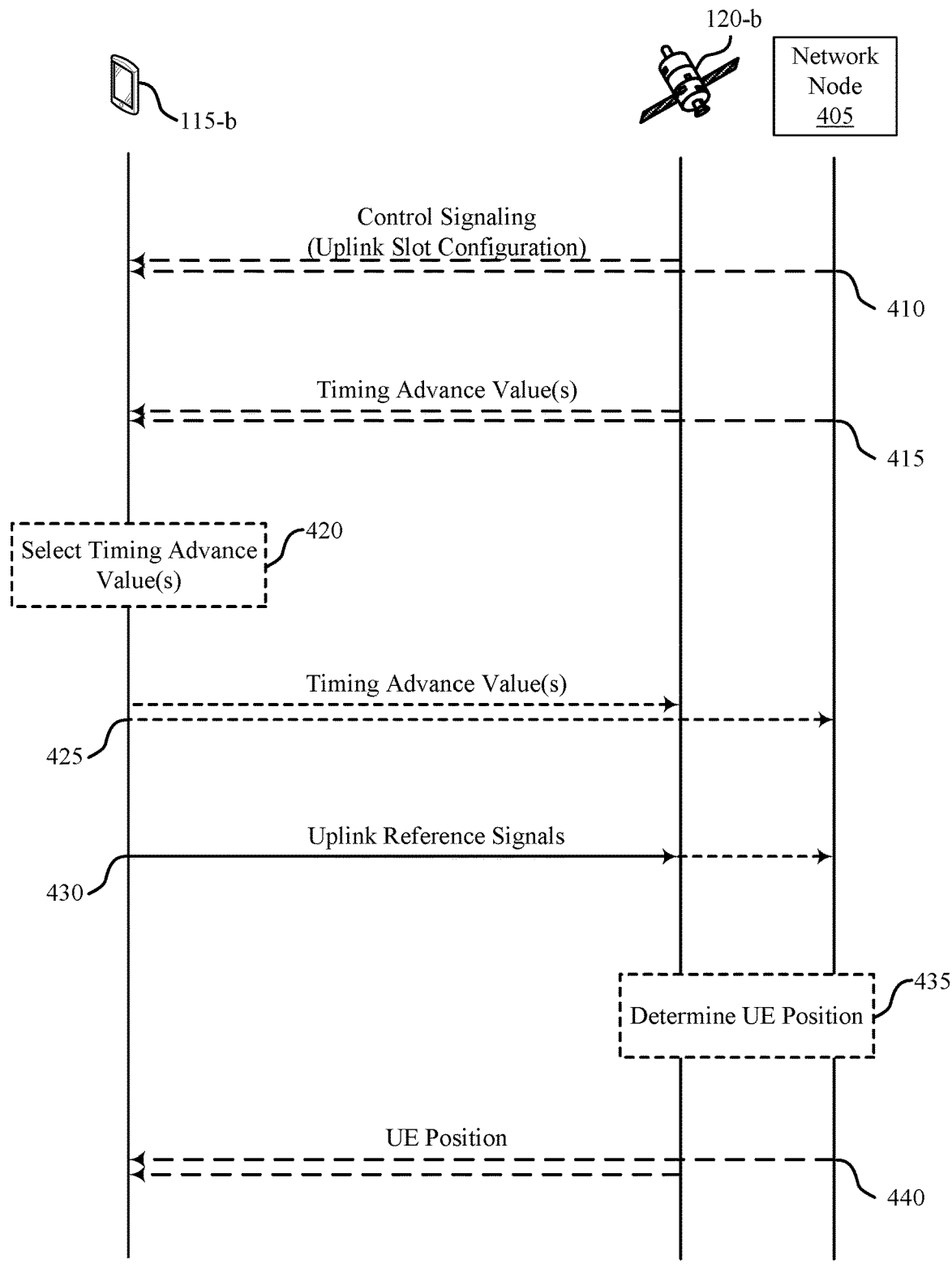
FIG. 4 illustrates an example of a process flow that supports techniques for sequential uplink transmissions-based positioning for NTNs in accordance with aspects of the present disclosure.

FIG. 4 illustrates an example of a process flow 400 that supports techniques for sequential uplink transmissions-based positioning for NTNs in accordance with aspects of the present disclosure. In some examples, the process flow 400 may implement, or be implemented by, aspects of wireless communications systems 100, wireless communications system 200, resource configuration 300, or any combination thereof. For example, process flow 400 illustrates a UE 115-b receiving a configuration for a set of uplink slots, transmitting uplink reference signals (e.g., PRSs, SRSs) within the configured uplink slots, and receiving an indication of a position of the UE 115-b which is determined based on the transmitted uplink reference signals, as described with reference to FIGS. 1-3.

In some cases, process flow 400 may include a UE 115-b, a network node 405, and a satellite 120-b, which may be examples of corresponding devices as described herein. For example, the UE 115-b and the satellite 120-b illustrated in FIG. 4 may include examples of the UE 115-a and the satellite 120-b, respectively, as illustrated in FIG. 2. Moreover, the network node 405 illustrated in FIG. 4 may include an example of a base station 105, a satellite 120, or both. For example, in some cases, the network node 405 may include a base station 105. In some instances, the satellite 120-b may serve as a bent pipe/transparent satellite 120 which is configured to relay communications between the UE 115-b and the network node 405 (e.g., base station 105). In other cases, the network node 405 may include the satellite 120-b (e.g., the network node 405 and the satellite 120-b may be the same wireless device).

In some examples, the operations illustrated in process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 410, the UE 115-b may receive, from the satellite 120-b, control signaling which identifies a configuration for a set of uplink TTIs (e.g., uplink slots) which may be used to transmit uplink reference signals (e.g., PRSs, SRSs) to the satellite 120-b. In particular, the control signaling may indicate a set of uplink slots for uplink reference signals which will be used for timing estimation and for determining a position of the UE 115-b. For example, as shown in the first resource allocation scheme 305-a illustrated in FIG. 3, the control signaling may indicate a configuration for a set of uplink slots 310-a, 310-b, 310-c for transmitting uplink reference signals 320 to the satellite 120-b. The control signaling may include a system information message (e.g., SIB), RRC signaling, a MAC-CE message, a DCI message, or any combination thereof.

In some aspects, the control signaling may include an indication of each uplink slot of the set of uplink slots. For example, referring to the first resource allocation scheme 305-a, the control signaling may indicate a position of each of the uplink slots 310-a, 310-b, and 310-c in the time domain. In additional or alternative implementations, the control signaling may indicate a starting slot for the set of uplink slots and a period that may be used to identify each of the uplink slots. For example, referring again to the first resource allocation scheme 305-a, the control signaling may indicate a position of the first uplink slot 310-a (e.g., slot N), and may indicate a period K that may be used to identify subsequent uplink slots 310-b, 310-c. In this example, the first uplink slot 310-a may be at/within slot N, where the second uplink slot 310-b and the third uplink slot 310-c are at/within slots N+K and N+2K, respectively.

At 415, the UE 115-b may receive, from the satellite 120-b, an indication of one or more timing advance values which are to be used for transmitting uplink reference signals. In other words, the UE 115-b may receive an indication of one or more timing advance values for the set of uplink slots which will be used to transmit uplink reference signals. The UE 115-b may receive, and the satellite 120-b may transmit, the indication of the one or more timing advance values at 415 based on receiving/transmitting the control signaling at 410.

As noted previously herein, in some implementations, the satellite 120-b may configure the UE 115-b to use a same timing advance value for all uplink reference signals. For example, in some cases, the satellite 120-b may transmit an indication that each uplink reference signal of the set of uplink reference signals is to be transmitted with a same (e.g., common) timing advance value. In such cases, the satellite 120-b may not expressly indicate (or know) which timing advance value will be used by the UE 115-b, but will determine that each uplink reference signal will be transmitted with a same timing advance value.

In additional or alternative implementations, the satellite 120-b may expressly indicate pre-configured timing advance values which are to be used. In this regard, the UE 115-b may be configured to transmit uplink reference signals in accordance with one or more pre-configured timing advance values. In some aspects, timing advance values configured by the satellite 120-b (e.g., pre-configured timing advance values) may include positive timing advance values, negative timing advance values, or both. As described previously herein, positive timing advance values may include/define a time interval prior to a transmission time interval (e.g., time interval prior to/leading up to a downlink slot 315), whereas negative timing advance values may include/define a time interval following a transmission time interval (e.g., time interval following a downlink slot 315).

Moreover, pre-configured timing advance values may be the same for all UEs 115 in a same cell or in a same beam (e.g., based on timing advance values reported by one or more UEs 115). For example, in cases where the satellite 120-*b* indicates pre-configured timing advance values at 415, the timing advance values may be associated with a set of UEs 115 in a cell served by the satellite 120-*b* and/or network node 405, a set of UEs 115 associated with a beam of the satellite 120-*b* and/or network node, or both. In this regard, the satellite 120-*b* may configure a set of UEs 115 which share one or more parameters characteristics (e.g., cell, beam) with a common timing advance value (e.g., first timing advance value(s) for a first set of UEs 115, second timing advance value(s) for a second set of UEs 115). In additional or alternative cases, the satellite 120-*b* may configure each UE 115 (e.g., UE 115-*b*) with UE-specific timing advance values (e.g., based on timing advance values reported by each respective UE 115).

At 420, the UE 115-*b* may select one or more timing advance values which will be used to transmit uplink reference signals to the satellite 120-*b*. In some aspects, the UE 115-*b* may select one or more timing advance values at 420 based on receiving the control signaling at 410, receiving an indication of one or more timing advance values at 415, or both.

For example, as noted previously herein, the signaling at 415 may indicate that the UE 115-*b* is to transmit each uplink reference signal with a same timing advance value. In such cases, the UE 115-*b* may select a timing advance value from a set of timing advance values based on the indication.

In additional or alternative implementations, the UE 115-*b* may be configured to use separate timing advance values based on a downlink and uplink timing difference. For example, referring to FIG. 3, the UE 115-*b* may be configured to select timing advance values for each respective uplink slot 310 based on a timing difference (e.g., propagation delay) between each uplink slot 310 and the corresponding downlink slot 315 (e.g., time difference/propagation delay between uplink slot 310-*a* and downlink slot 315-*a*). In other words, the UE 115-*b* may be configured to select timing advance values for each respective uplink slot based on a propagation delay of signals transmitted between the UE 115-*b* and the satellite 120-*b* within each uplink slot. In such cases, the UE 115-*b* may be configured to select the one or more timing advance values at 420 without an express indication of timing advance values from the satellite 120-*b* at 415.

At 425, the UE 115-*b* may transmit, to the satellite 120-*b*, an indication of the one or more timing advance values which will be used to transmit uplink reference signals. In particular, the UE 115-*b* may transmit to the satellite 120-*b*, the network node 405, or both, one or more timing advance values corresponding to the set of uplink reference signals and corresponding uplink slots. In some aspects, the UE 115-*b* may transmit the indication of the timing advance value(s) at 425 based on receiving the control signaling at 410, receiving the indication of one or more timing advance values at 415, selecting the timing advance values at 420, or any combination thereof.

The quantity of timing advance values which are reported at 425, as well as the necessity of the reporting at 425, may be dependent on how the timing advance values are determined. For example, as described previously herein, the UE 115-*b* may select separate timing advance values for each respective uplink slot based on propagation delays/timing difference. In this example, the UE 115-*b* may be configured to report each respective timing advance value via one or more transmissions. In this regard, each individual timing advance value may be reported separately in separate transmissions, or aggregated in a single transmission. For instance, in some cases, the UE 115-*b* may determine an aggregated timing advance value based on the set of multiple timing advance values, and may transmit an indication of the aggregated timing advance value.

In other cases, such as in cases where each uplink reference signal will be transmitted via a single timing advance value, the UE 115-*b* may only report a single timing advance value to the satellite 120-*b* at 425. For example, in cases where the satellite 120-*b* indicates that a single timing advance value will be used for all uplink reference signals, the UE 115-*b* may select a timing advance value from a set of candidate timing advance values. IN such cases, the UE 115-*b* may transmit an indication of the selected timing advance value to the satellite 120-*b* and/or network node 405 at 425. Comparatively, in cases where the satellite 120-*b* configures the UE 115-*b* with one or more pre-configured timing advance values at 415, the UE 115-*b* may not be required to report the timing advance values to the satellite 120-*b* at 425, as the satellite 120-*b* would already know the timing advance value(s) that will be used.

At 430, the UE 115-*b* may transmit, to the satellite 120-*b*, a set of uplink reference signals. In particular, the UE 115-*b* may transmit the set of uplink reference signals on/within the set of uplink slots indicated by the configuration received via the control signaling at 410. For example, as shown in FIG. 3, the UE 115-*b* may transmit a set of uplink reference signals 320 within the set of uplink slots 310. Further, the UE 115-*b* may transmit the set of uplink reference signals based on (e.g., in accordance with) the one or more determined/selected timing advance values. In this regard, the UE 115-*b* may transmit the set of uplink reference signals at 430 based on receiving the configuration at 410, receiving the timing advance value(s) at 415, selecting the timing advance value(s) at 420, reporting the timing advance value(s) at 425, or any combination thereof.

The uplink reference signals may include, but are not limited to, PRSs, SRSs, or both. Although FIG. 4 illustrates the UE 115-*b* as reporting the timing advance values which will be used via separate signaling at 425, this is not to be regarded as a limitation of the present disclosure, unless noted otherwise herein. For example, in some implementations, the UE 115-*b* may report the timing advance values via the uplink reference signals at 430.

At 435, the satellite 120-*b*, the network node 405, or both, may be configured to determine a position (e.g., geographical position) of the UE 115-*b*. In particular, the satellite 120-*b* may be configured to determine a position of the UE 115-*b* based on the uplink reference signals received at 430, and corresponding timing advance values used for the respective uplink reference signals.

For example, as described previously herein, the satellite 120-*b* and/or network node may be configured to determine a position of the UE 115-*b* based on the position of the satellite 120-*b* at a time that each respective uplink reference signal is received, the timing advance value used for each respective uplink reference signal, a time-of-arrival of each respective uplink reference signal, or any combination thereof. In this regard, the satellite 120-*b*, the network node 405, or both, may be configured to determine the position of the UE 115-*b* based on transmitting the control signaling at 410, transmitting the timing advance value(s) at 415, receiving the timing advance value(s) at 425, receiving the uplink reference signals at 430, or any combination thereof.

At 440, the UE 115-*b* may receive an indication of the position of the UE 115-*b* from the satellite 120-*b*, the network node 405, or both. In particular, the UE 115-*b* may receive an indication of the position of the UE 115-*b* based on (e.g., in response to) transmitting the uplink reference signals at 430. In this regard, the UE 115-*b* may receive (and the satellite 120-*b*/network node 405 may transmit) the indication of the position of the UE 115-*b* at 440 based on transmitting/receiving the control signaling at 410, transmitting/receiving the timing advance value(s) at 415, transmitting/receiving the timing advance value(s) at 425, transmitting/receiving the uplink reference signals at 430, determining the UE 115-*b* position at 435, or any combination thereof.

Techniques described herein may enable a geographical position of the UE 115-*b* to be determined in the context of an NTN. In particular, techniques described herein may utilize timing advance values for PRSs transmitted from the UE 115-*b* to the satellite 120-*b* to enable a geographical position of the UE 115-*b* to be determined. Techniques described herein may enable positional determinations for the UE 115-*b* to be made without relying on an internal clock at the UE 115-*b*, and in cases where the UE 115-*b* is communicatively coupled to only a single satellite 120 (e.g., satellite 120-*b*) at a time. As such, aspects of the present disclosure may enable improved positional determinations in the context of NTNs, thereby facilitating positional applications (e.g., GPS), and enabling more efficient and reliable wireless communications.

Figure 5:
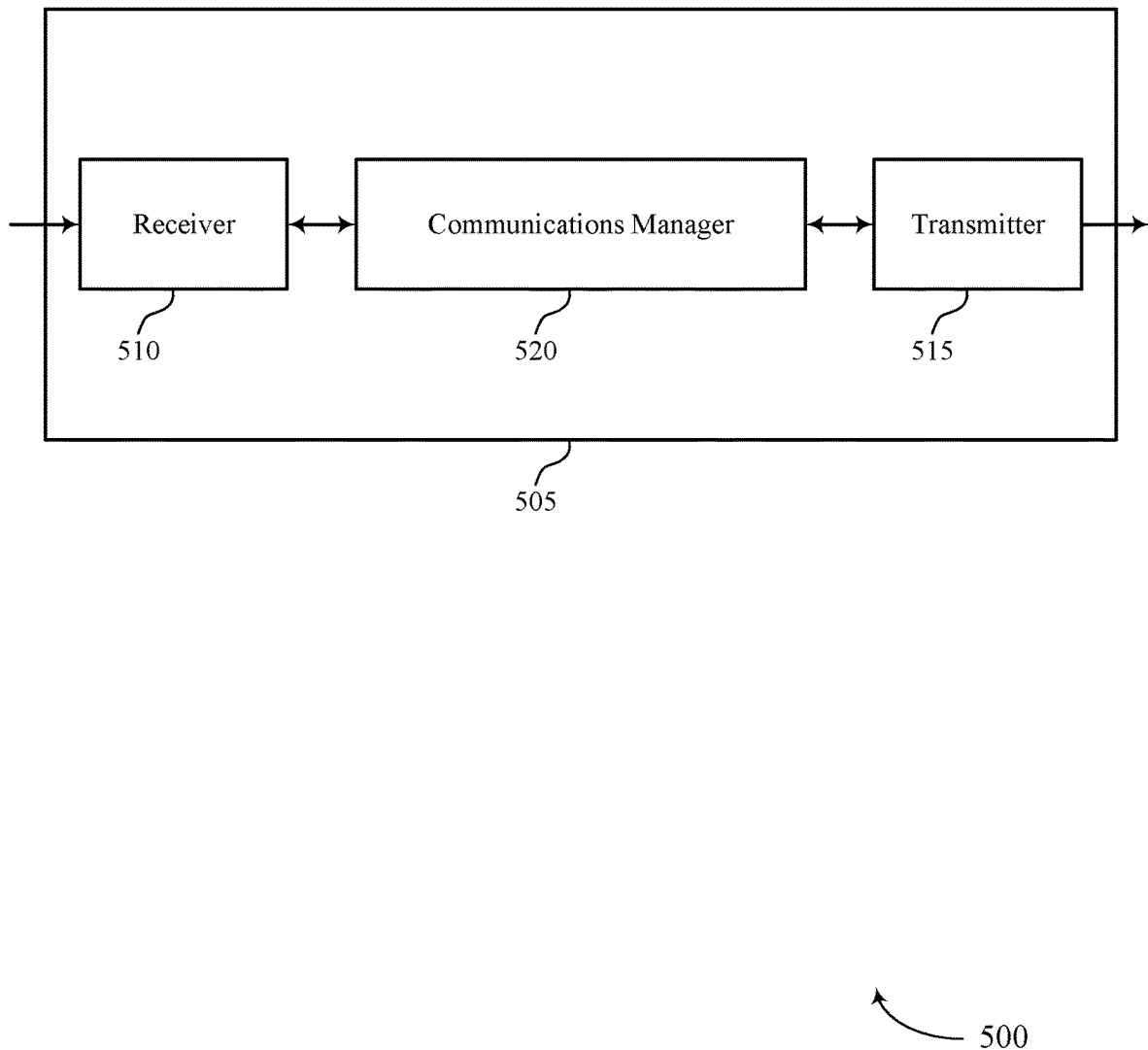
FIGS. 5 and 6 show block diagrams of devices that support techniques for sequential uplink transmissions-based positioning for NTNs in accordance with aspects of the present disclosure.

FIG. 5 shows a block diagram 500 of a device 505 that supports techniques for sequential uplink transmissions-based positioning for NTNs in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for sequential uplink transmissions-based positioning for NTNs). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for sequential uplink transmissions-based positioning for NTNs). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of techniques for sequential uplink transmissions-based positioning for NTNs as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for receiving control signaling identifying a configuration of a set of uplink slots for the UE to transmit uplink reference signals to a satellite. The communications manager 520 may be configured as or otherwise support a means for transmitting, to the satellite, a set of uplink reference signals on the set of uplink slots according to the configuration. The communications manager 520 may be configured as or otherwise support a means for receiving, from a network node, an indication of a position of the UE based on the set of uplink reference signals.

By including or configuring the communications manager 520 in accordance with examples as described herein, the device 505 (e.g., a processor controlling or otherwise coupled to the receiver 510, the transmitter 515, the communications manager 520, or a combination thereof) may support techniques which enable a geographical position of a UE 115 to be determined in the context of an NTN. In particular, techniques described herein may utilize timing advance values for PRSs transmitted from a UE 115 to a single satellite 120 to enable a geographical position of the UE 115 to be determined. Techniques described herein may enable positional determinations for a UE 115 to be made without relying on an internal clock at the UE 115, and in cases where the UE 115 is communicatively coupled to only a single satellite 120 at a time. As such, aspects of the present disclosure may enable improved positional determinations in the context of NTNs, thereby facilitating positional applications (e.g., GPS), and enabling more efficient and reliable wireless communications.

Figure 6:
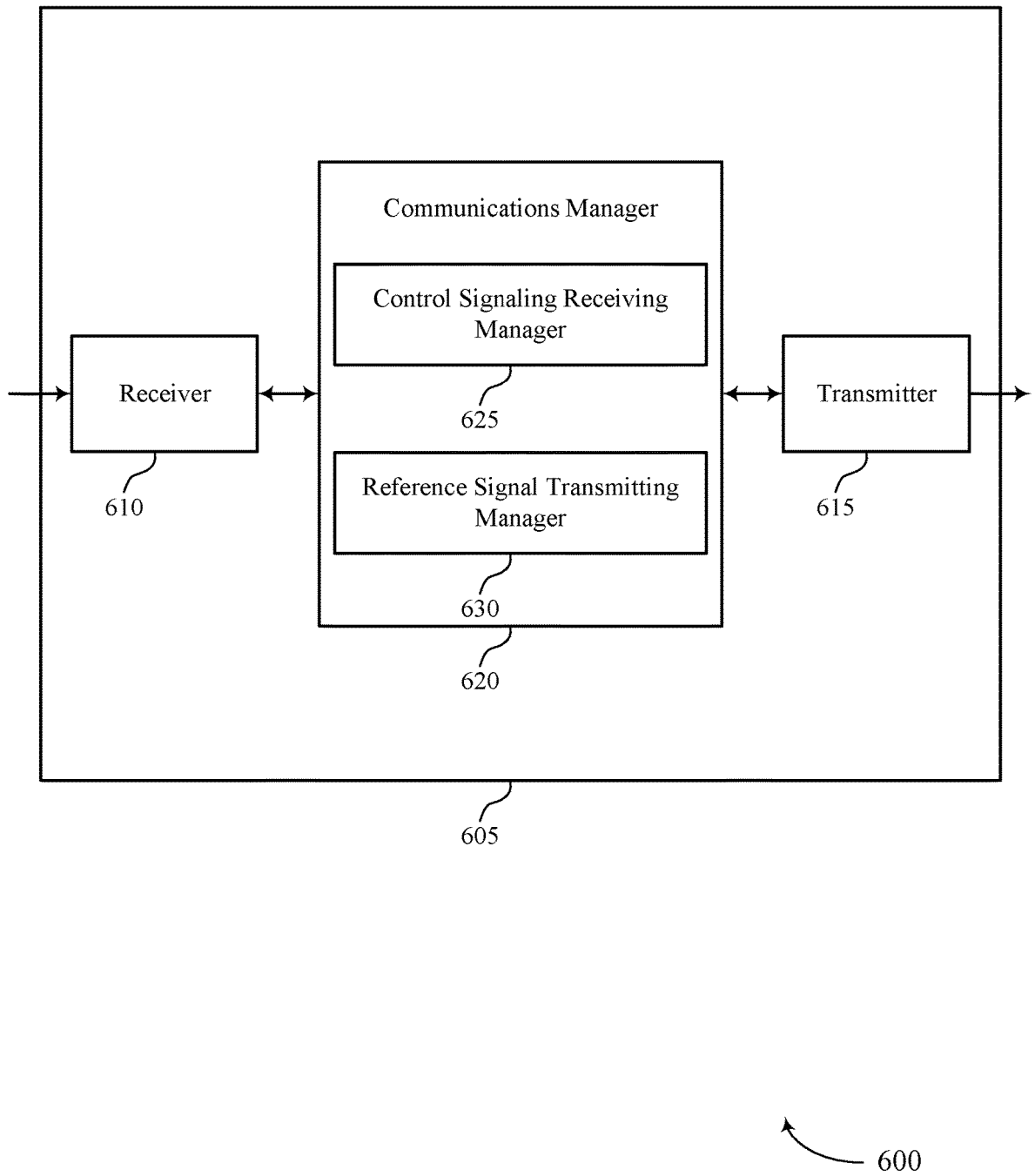

FIG. 6 shows a block diagram 600 of a device 605 that supports techniques for sequential uplink transmissions-based positioning for NTNs in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for sequential uplink transmissions-based positioning for NTNs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for sequential uplink transmissions-based positioning for NTNs). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of techniques for sequential uplink transmissions-based positioning for NTNs as described herein. For example, the communications manager 620 may include a control signaling receiving manager 625 a reference signal transmitting manager 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The control signaling receiving manager 625 may be configured as or otherwise support a means for receiving control signaling identifying a configuration of a set of uplink slots for the UE to transmit uplink reference signals to a satellite. The reference signal transmitting manager 630 may be configured as or otherwise support a means for transmitting, to the satellite, a set of uplink reference signals on the set of uplink slots according to the configuration. The control signaling receiving manager 625 may be configured as or otherwise support a means for receiving, from a network node, an indication of a position of the UE based on the set of uplink reference signals.

Figure 7:
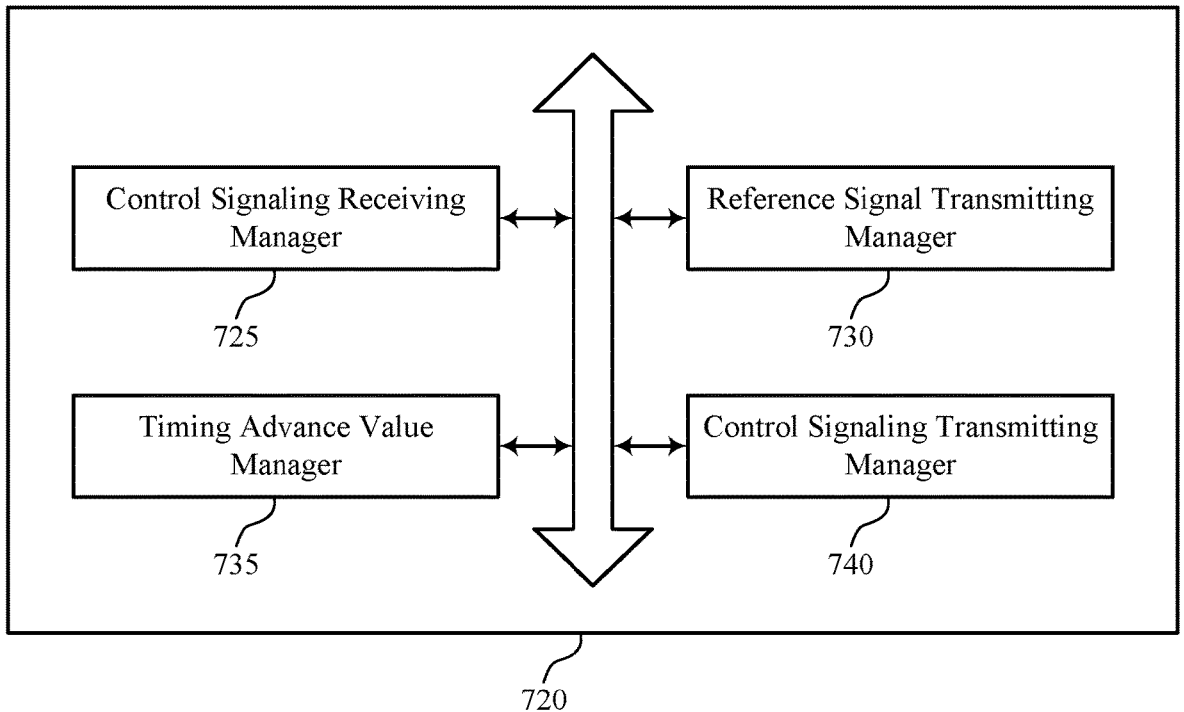
FIG. 7 shows a block diagram of a communications manager that supports techniques for sequential uplink transmissions-based positioning for NTNs in accordance with aspects of the present disclosure.

FIG. 7 shows a block diagram 700 of a communications manager 720 that supports techniques for sequential uplink transmissions-based positioning for NTNs in accordance with aspects of the present disclosure. The communications manager 720 may be an example of aspects of a communications manager 520, a communications manager 620, or both, as described herein. The communications manager 720, or various components thereof, may be an example of means for performing various aspects of techniques for sequential uplink transmissions-based positioning for NTNs as described herein. For example, the communications manager 720 may include a control signaling receiving manager 725, a reference signal transmitting manager 730, a timing advance value manager 735, a control signaling transmitting manager 740, or any combination thereof. Each of these components may communicate, directly or indirectly, with one another (e.g., via one or more buses).

The communications manager 720 may support wireless communication at a UE in accordance with examples as disclosed herein. The control signaling receiving manager 725 may be configured as or otherwise support a means for receiving control signaling identifying a configuration of a set of uplink slots for the UE to transmit uplink reference signals to a satellite. The reference signal transmitting manager 730 may be configured as or otherwise support a means for transmitting, to the satellite, a set of uplink reference signals on the set of uplink slots according to the configuration. In some examples, the control signaling receiving manager 725 may be configured as or otherwise support a means for receiving, from a network node, an indication of a position of the UE based on the set of uplink reference signals.

In some examples, to support receiving the control signaling identifying the configuration, the control signaling receiving manager 725 may be configured as or otherwise support a means for receiving an indication for each slot of the set of uplink slots or a first indication of a starting slot and a period that identify the set of uplink slots.

In some examples, to support transmitting the set of uplink reference signals, the reference signal transmitting manager 730 may be configured as or otherwise support a means for transmitting the set of uplink reference signals on the set of uplink slots according to a set of timing advance values.

In some examples, the timing advance value manager 735 may be configured as or otherwise support a means for receiving, from the network node, an indication that each uplink reference signal of the set of uplink reference signals is to be transmitted with a same timing advance value, where the set of uplink reference signals are transmitted on the set of uplink slots in accordance with the same timing advance value.

In some examples, the timing advance value manager 735 may be configured as or otherwise support a means for selecting a timing advance value from a set of candidate timing advance values based on the indication that each uplink reference signal of the set of uplink reference signals is to be transmitted with the same timing advance value. In some examples, the control signaling transmitting manager 740 may be configured as or otherwise support a means for transmitting, to the network node, an indication of the selected timing advance value, where the set of uplink reference signals are transmitted on the set of uplink slots in accordance with the selected timing advance value.

In some examples, the timing advance value manager 735 may be configured as or otherwise support a means for transmitting, to the network node, one or more timing advance values corresponding to the set of uplink reference signals transmitted by the UE on the set of uplink slots.

In some examples, to support transmitting the one or more timing advance values, the timing advance value manager 735 may be configured as or otherwise support a means for transmitting an aggregated timing advance value generated from a set of multiple timing advance values for the set of uplink reference signals.

In some examples, to support transmitting the one or more timing advance values, the timing advance value manager 735 may be configured as or otherwise support a means for transmitting a first message that includes an indication of the first one or more timing advance values. In some examples, to support transmitting the one or more timing advance values, the timing advance value manager 735 may be configured as or otherwise support a means for transmitting a second message that includes an indication of the second one or more timing advance values.

In some examples, the one or more timing advance values include a set of multiple timing advance values and, to support transmitting the one or more timing advance values, the timing advance value manager 735 may be configured as or otherwise support a means for transmitting a timing advance value selected from the set of multiple timing advance values.

In some examples, the control signaling receiving manager 725 may be configured as or otherwise support a means for receiving, from the network node, a timing advance value for the set of uplink slots, the set of uplink reference signals transmitted by the UE on the set of uplink slots according to the timing advance value.

In some examples, the timing advance value includes a time interval prior to a TTI at the UE, a time interval following a TTI at the UE, or both.

In some examples, the timing advance value is associated with a set of multiple UEs in a cell served by the network node, a beam of the network node, or any combination thereof.

In some examples, the timing advance value is associated with a first set of UEs served by the network node, including the UE, and a second timing advance value is associated with a second set of UEs served by the network node.

In some examples, to support receiving the control signaling identifying the configuration of the set of uplink slots, the control signaling receiving manager 725 may be configured as or otherwise support a means for receiving an indication of the set of uplink slots in a system information message, RRC signaling, a MAC-CE message, a downlink control information message, or any combination thereof.

In some examples, the set of uplink reference signals include SRSs, PRSs, or any combination thereof.

Figure 8:
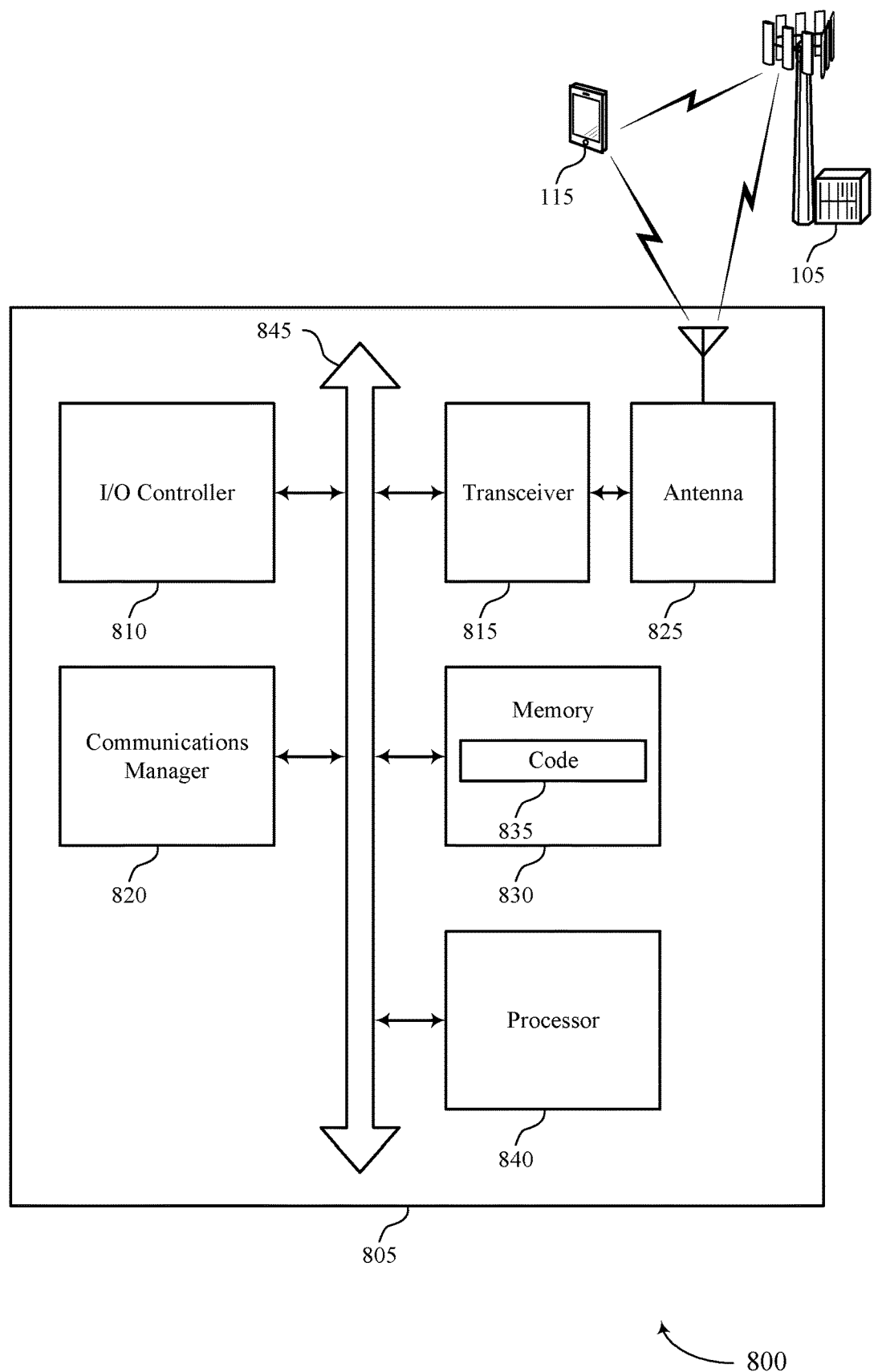
FIG. 8 shows a diagram of a system including a device that supports techniques for sequential uplink transmissions-based positioning for NTNs in accordance with aspects of the present disclosure.

FIG. 8 shows a diagram of a system 800 including a device 805 that supports techniques for sequential uplink transmissions-based positioning for NTNs in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting techniques for sequential uplink transmissions-based positioning for NTNs). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for receiving control signaling identifying a configuration of a set of uplink slots for the UE to transmit uplink reference signals to a satellite. The communications manager 820 may be configured as or otherwise support a means for transmitting, to the satellite, a set of uplink reference signals on the set of uplink slots according to the configuration. The communications manager 820 may be configured as or otherwise support a means for receiving, from a network node, an indication of a position of the UE based on the set of uplink reference signals.

By including or configuring the communications manager 820 in accordance with examples as described herein, the device 805 may support techniques which enable a geographical position of a UE 115 to be determined in the context of an NTN. In particular, techniques described herein may utilize timing advance values for PRSs transmitted from a UE 115 to a single satellite 120 to enable a geographical position of the UE 115 to be determined. Techniques described herein may enable positional determinations for a UE 115 to be made without relying on an internal clock at the UE 115, and in cases where the UE 115 is communicatively coupled to only a single satellite 120 at a time. As such, aspects of the present disclosure may enable improved positional determinations in the context of NTNs, thereby facilitating positional applications (e.g., GPS), and enabling more efficient and reliable wireless communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of techniques for sequential uplink transmissions-based positioning for NTNs as described herein, or the processor 840 and the memory 830 may be otherwise configured to perform or support such operations.

Figure 9:
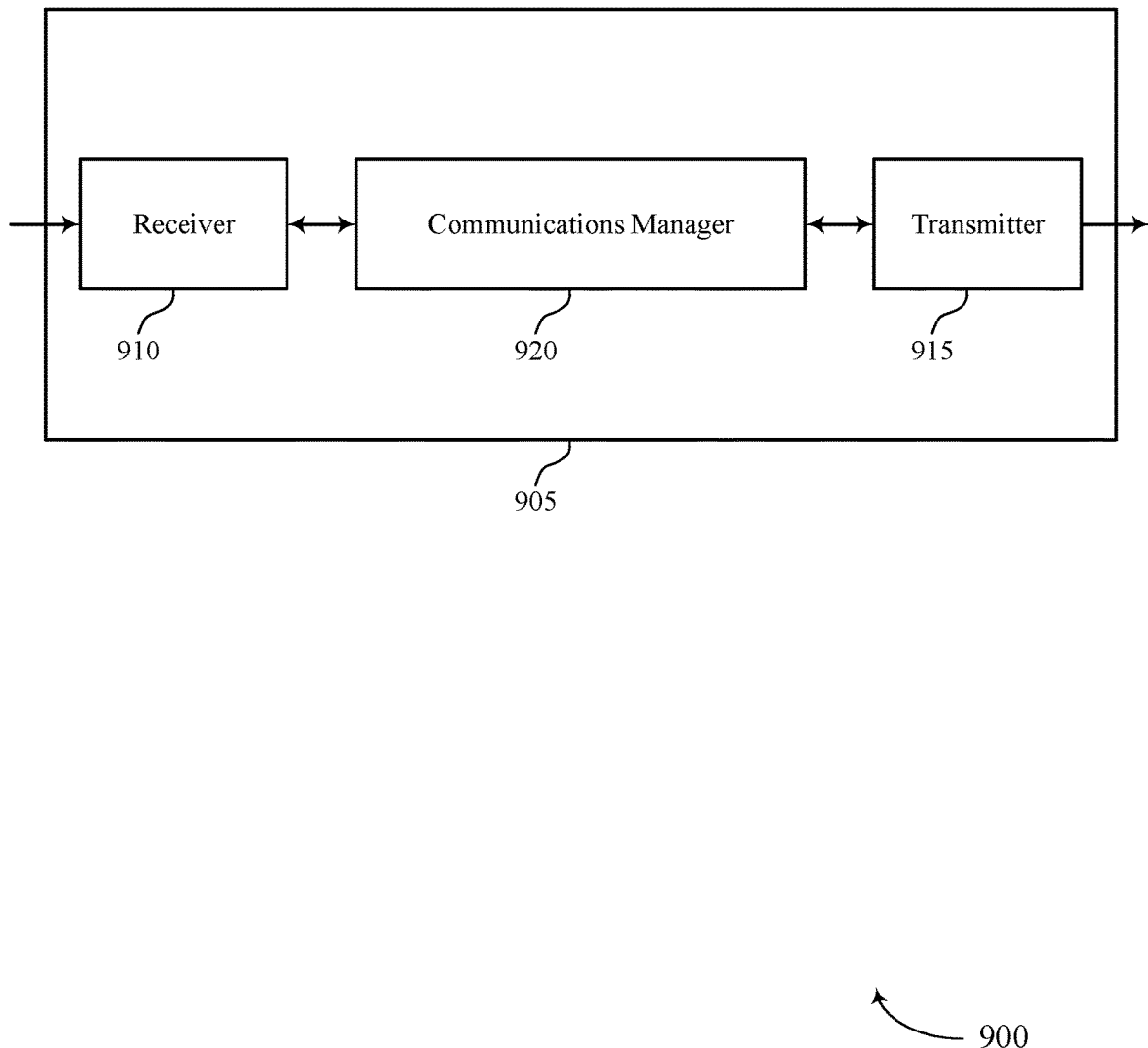
FIGS. 9 and 10 show block diagrams of devices that support techniques for sequential uplink transmissions-based positioning for NTNs in accordance with aspects of the present disclosure.

FIG. 9 shows a block diagram 900 of a device 905 that supports techniques for sequential uplink transmissions-based positioning for NTNs in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for sequential uplink transmissions-based positioning for NTNs). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for sequential uplink transmissions-based positioning for NTNs). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for sequential uplink transmissions-based positioning for NTNs as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a network node in accordance with examples as disclosed herein. For example, the communications manager 920 may be configured as or otherwise support a means for transmitting, to a UE, control signaling identifying a configuration of a set of uplink slots for the UE to transmit uplink reference signals to a satellite associated with the network node. The communications manager 920 may be configured as or otherwise support a means for receiving, from the UE, a set of uplink reference signals on the set of uplink slots according to the configuration. The communications manager 920 may be configured as or otherwise support a means for transmitting, to the UE, an indication of a position of the UE based on the set of uplink reference signals.

By including or configuring the communications manager 920 in accordance with examples as described herein, the device 905 (e.g., a processor controlling or otherwise coupled to the receiver 910, the transmitter 915, the communications manager 920, or a combination thereof) may support techniques which enable a geographical position of a UE 115 to be determined in the context of an NTN. In particular, techniques described herein may utilize timing advance values for PRSs transmitted from a UE 115 to a single satellite 120 to enable a geographical position of the UE 115 to be determined. Techniques described herein may enable positional determinations for a UE 115 to be made without relying on an internal clock at the UE 115, and in cases where the UE 115 is communicatively coupled to only a single satellite 120 at a time. As such, aspects of the present disclosure may enable improved positional determinations in the context of NTNs, thereby facilitating positional applications (e.g., GPS), and enabling more efficient and reliable wireless communications.

Figure 10:
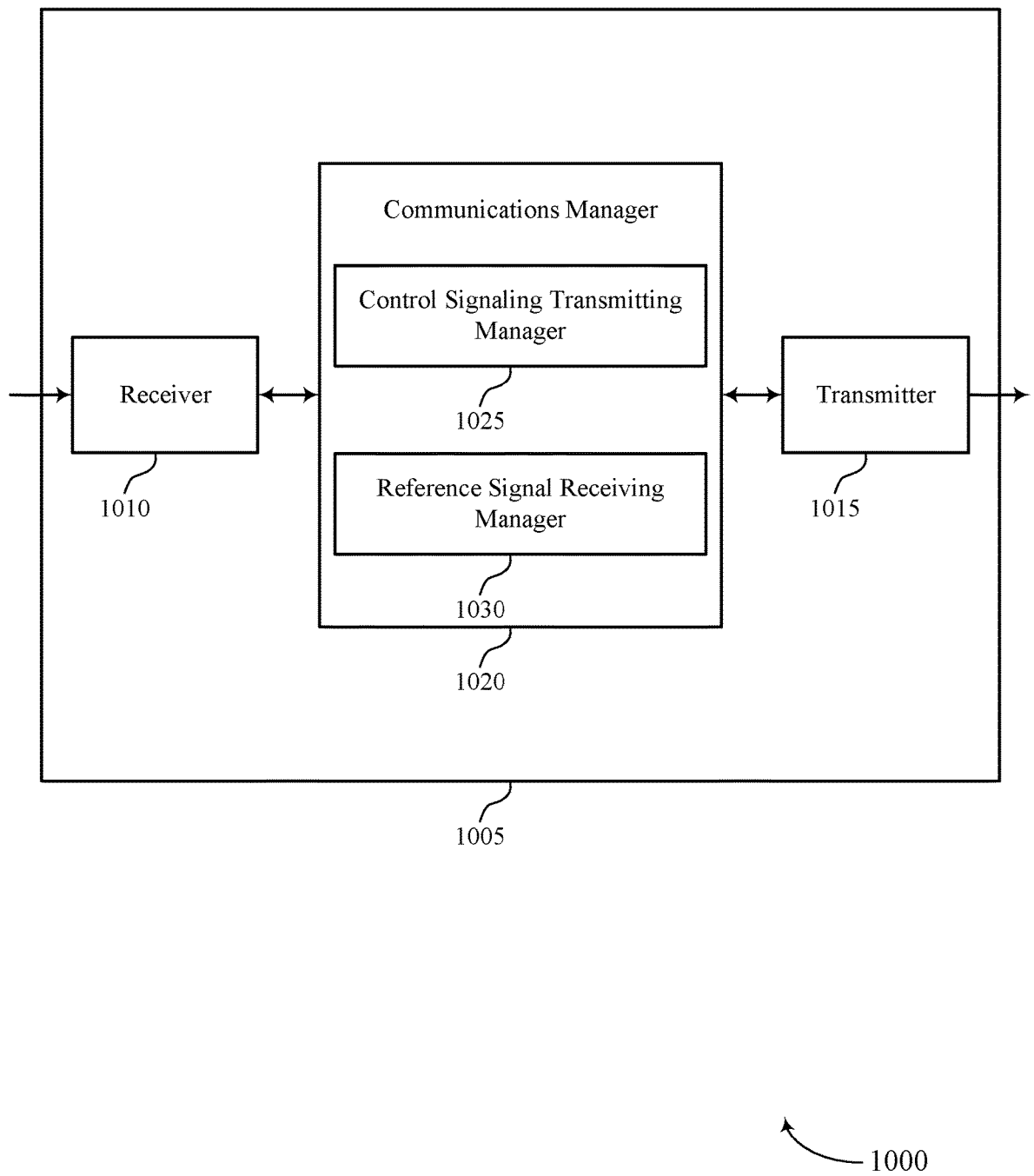

FIG. 10 shows a block diagram 1000 of a device 1005 that supports techniques for sequential uplink transmissions-based positioning for NTNs in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for sequential uplink transmissions-based positioning for NTNs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for sequential uplink transmissions-based positioning for NTNs). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for sequential uplink transmissions-based positioning for NTNs as described herein. For example, the communications manager 1020 may include a control signaling transmitting manager 1025 a reference signal receiving manager 1030, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a network node in accordance with examples as disclosed herein. The control signaling transmitting manager 1025 may be configured as or otherwise support a means for transmitting, to a UE, control signaling identifying a configuration of a set of uplink slots for the UE to transmit uplink reference signals to a satellite associated with the network node. The reference signal receiving manager 1030 may be configured as or otherwise support a means for receiving, from the UE, a set of uplink reference signals on the set of uplink slots according to the configuration. The control signaling transmitting manager 1025 may be configured as or otherwise support a means for transmitting, to the UE, an indication of a position of the UE based on the set of uplink reference signals.

Figure 11:
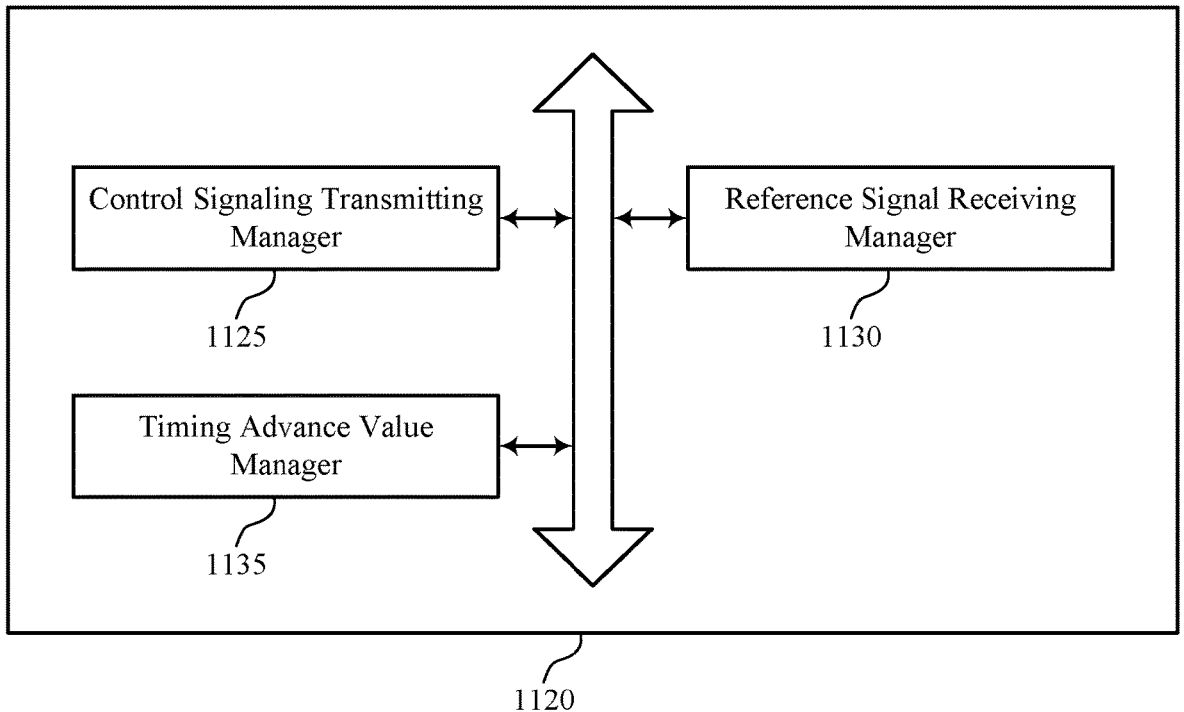
FIG. 11 shows a block diagram of a communications manager that supports techniques for sequential uplink transmissions-based positioning for NTNs in accordance with aspects of the present disclosure.

FIG. 11 shows a block diagram 1100 of a communications manager 1120 that supports techniques for sequential uplink transmissions-based positioning for NTNs in accordance with aspects of the present disclosure. The communications manager 1120 may be an example of aspects of a communications manager 920, a communications manager 1020, or both, as described herein. The communications manager 1120, or various components thereof, may be an example of means for performing various aspects of techniques for sequential uplink transmissions-based positioning for NTNs as described herein. For example, the communications manager 1120 may include a control signaling transmitting manager 1125, a reference signal receiving manager 1130, a timing advance value manager 1135, or any combination thereof. Each of these components may communicate, directly or indirectly, with one another (e.g., via one or more buses).

The communications manager 1120 may support wireless communication at a network node in accordance with examples as disclosed herein. The control signaling transmitting manager 1125 may be configured as or otherwise support a means for transmitting, to a UE, control signaling identifying a configuration of a set of uplink slots for the UE to transmit uplink reference signals to a satellite associated with the network node. The reference signal receiving manager 1130 may be configured as or otherwise support a means for receiving, from the UE, a set of uplink reference signals on the set of uplink slots according to the configuration. In some examples, the control signaling transmitting manager 1125 may be configured as or otherwise support a means for transmitting, to the UE, an indication of a position of the UE based on the set of uplink reference signals.

In some examples, to support transmitting the control signaling identifying the configuration, the control signaling transmitting manager 1125 may be configured as or otherwise support a means for transmitting an indication for each slot of the set of uplink slots or a first indication of a starting slot and a period that identify the set of uplink slots.

In some examples, to support receiving the set of uplink reference signals, the reference signal receiving manager 1130 may be configured as or otherwise support a means for receiving the set of uplink reference signals on the set of uplink slots according to a set of timing advance values.

In some examples, the timing advance value manager 1135 may be configured as or otherwise support a means for transmitting, to the UE, an indication that each uplink reference signal of the set of uplink reference signals is to be transmitted with a same timing advance value, where the set of uplink reference signals are transmitted on the set of uplink slots in accordance with the same timing advance value.

In some examples, the timing advance value manager 1135 may be configured as or otherwise support a means for receiving, from the UE and based on the indication that each uplink reference signal of the set of uplink reference signals is to be transmitted with the same timing advance value, an indication of a selected timing advance value, where the set of uplink reference signals are received on the set of uplink slots in accordance with the selected timing advance value.

In some examples, the timing advance value manager 1135 may be configured as or otherwise support a means for receiving, from the UE, one or more timing advance values corresponding to the set of uplink reference signals transmitted by the UE on the set of uplink slots.

In some examples, the timing advance value manager 1135 may be configured as or otherwise support a means for transmitting, to the UE, a timing advance value for the set of uplink slots, the set of uplink reference signals transmitted by the UE on the set of uplink slots according to the timing advance value.

Figure 12:
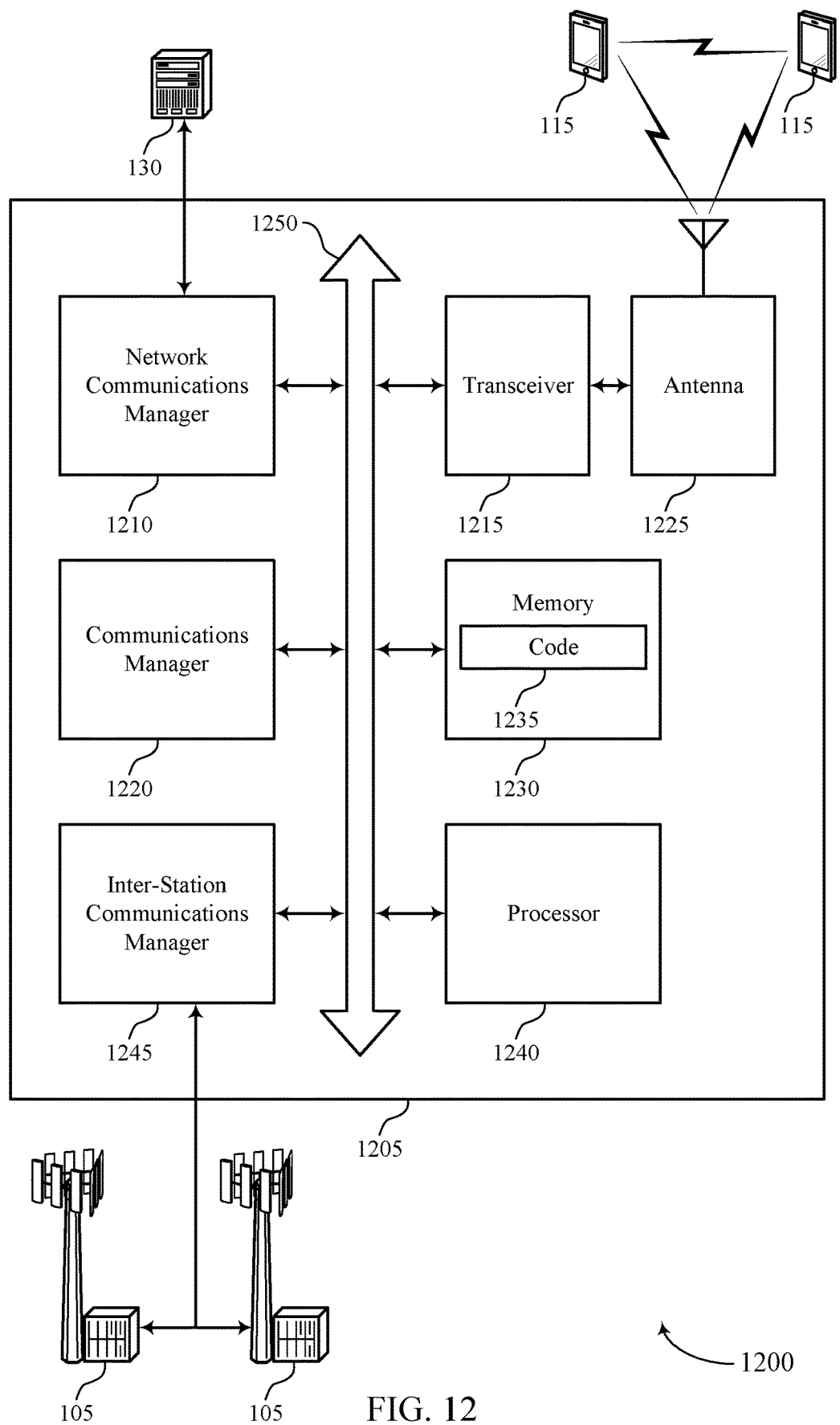
FIG. 12 shows a diagram of a system including a device that supports techniques for sequential uplink transmissions-based positioning for NTNs in accordance with aspects of the present disclosure.

FIG. 12 shows a diagram of a system 1200 including a device 1205 that supports techniques for sequential uplink transmissions-based positioning for NTNs in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for sequential uplink transmissions-based positioning for NTNs). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a network node in accordance with examples as disclosed herein. For example, the communications manager 1220 may be configured as or otherwise support a means for transmitting, to a UE, control signaling identifying a configuration of a set of uplink slots for the UE to transmit uplink reference signals to a satellite associated with the network node. The communications manager 1220 may be configured as or otherwise support a means for receiving, from the UE, a set of uplink reference signals on the set of uplink slots according to the configuration. The communications manager 1220 may be configured as or otherwise support a means for transmitting, to the UE, an indication of a position of the UE based on the set of uplink reference signals.

By including or configuring the communications manager 1220 in accordance with examples as described herein, the device 1205 may support techniques which enable a geographical position of a UE 115 to be determined in the context of an NTN. In particular, techniques described herein may utilize timing advance values for PRSs transmitted from a UE 115 to a single satellite 120 to enable a geographical position of the UE 115 to be determined. Techniques described herein may enable positional determinations for a UE 115 to be made without relying on an internal clock at the UE 115, and in cases where the UE 115 is communicatively coupled to only a single satellite 120 at a time. As such, aspects of the present disclosure may enable improved positional determinations in the context of NTNs, thereby facilitating positional applications (e.g., GPS), and enabling more efficient and reliable wireless communications.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for sequential uplink transmissions-based positioning for NTNs as described herein, or the processor 1240 and the memory 1230 may be otherwise configured to perform or support such operations.

Figure 13:
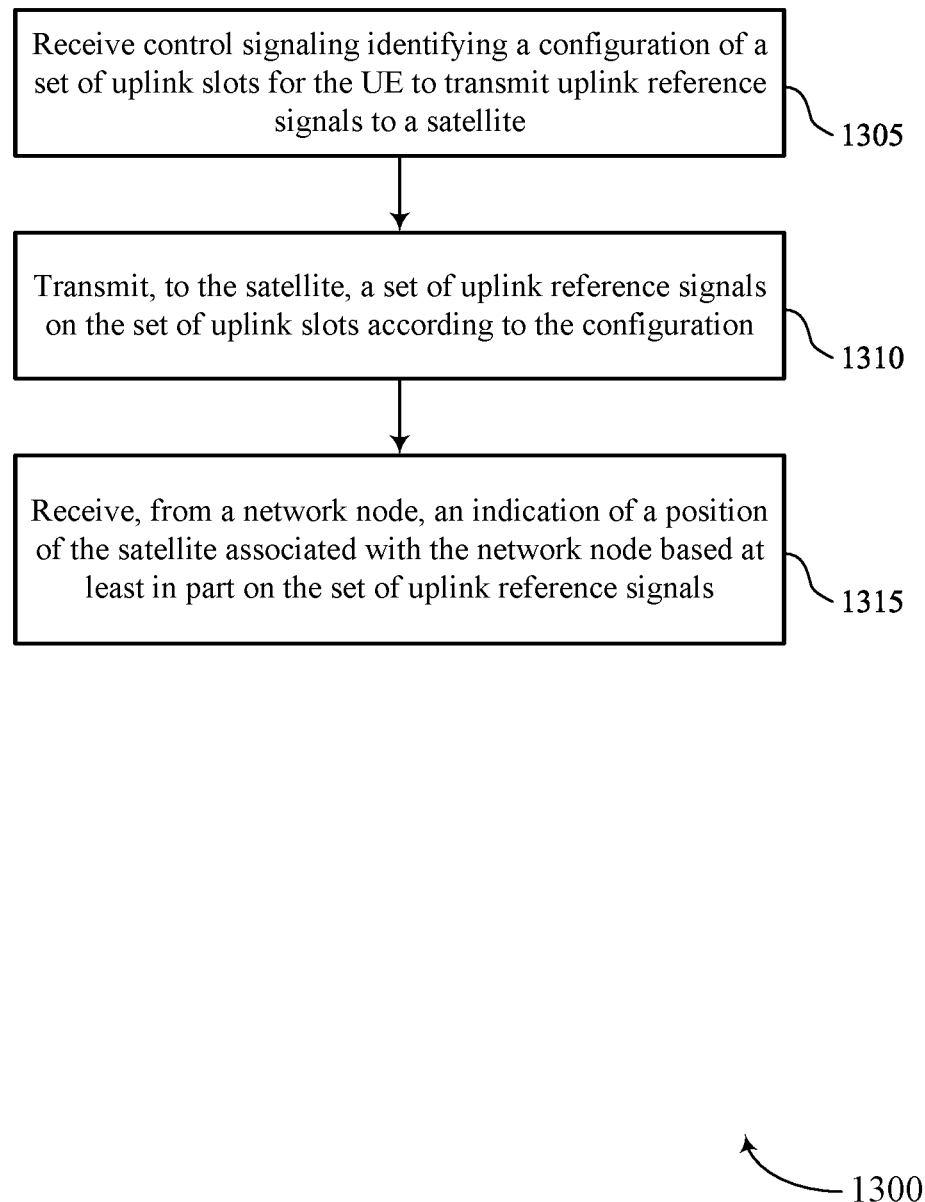
FIGS. 13 through 17 show flowcharts illustrating methods that support techniques for sequential uplink transmissions-based positioning for NTNs in accordance with aspects of the present disclosure.

FIG. 13 shows a flowchart illustrating a method 1300 that supports techniques for sequential uplink transmissions-based positioning for NTNs in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving control signaling identifying a configuration of a set of uplink slots for the UE to transmit uplink reference signals to a satellite. The operations of 1305 may be performed in accordance with examples as disclosed herein. In some examples, aspects of the operations of 1305 may be performed by a control signaling receiving manager 725 as described with reference to FIG. 7.

At 1310, the method may include transmitting, to the satellite, a set of uplink reference signals on the set of uplink slots according to the configuration. The operations of 1310 may be performed in accordance with examples as disclosed herein. In some examples, aspects of the operations of 1310 may be performed by a reference signal transmitting manager 730 as described with reference to FIG. 7.

At 1315, the method may include receiving, from a network node, an indication of a position of the UE based on the set of uplink reference signals. The operations of 1315 may be performed in accordance with examples as disclosed herein. In some examples, aspects of the operations of 1315 may be performed by a control signaling receiving manager 725 as described with reference to FIG. 7.

Figure 14:
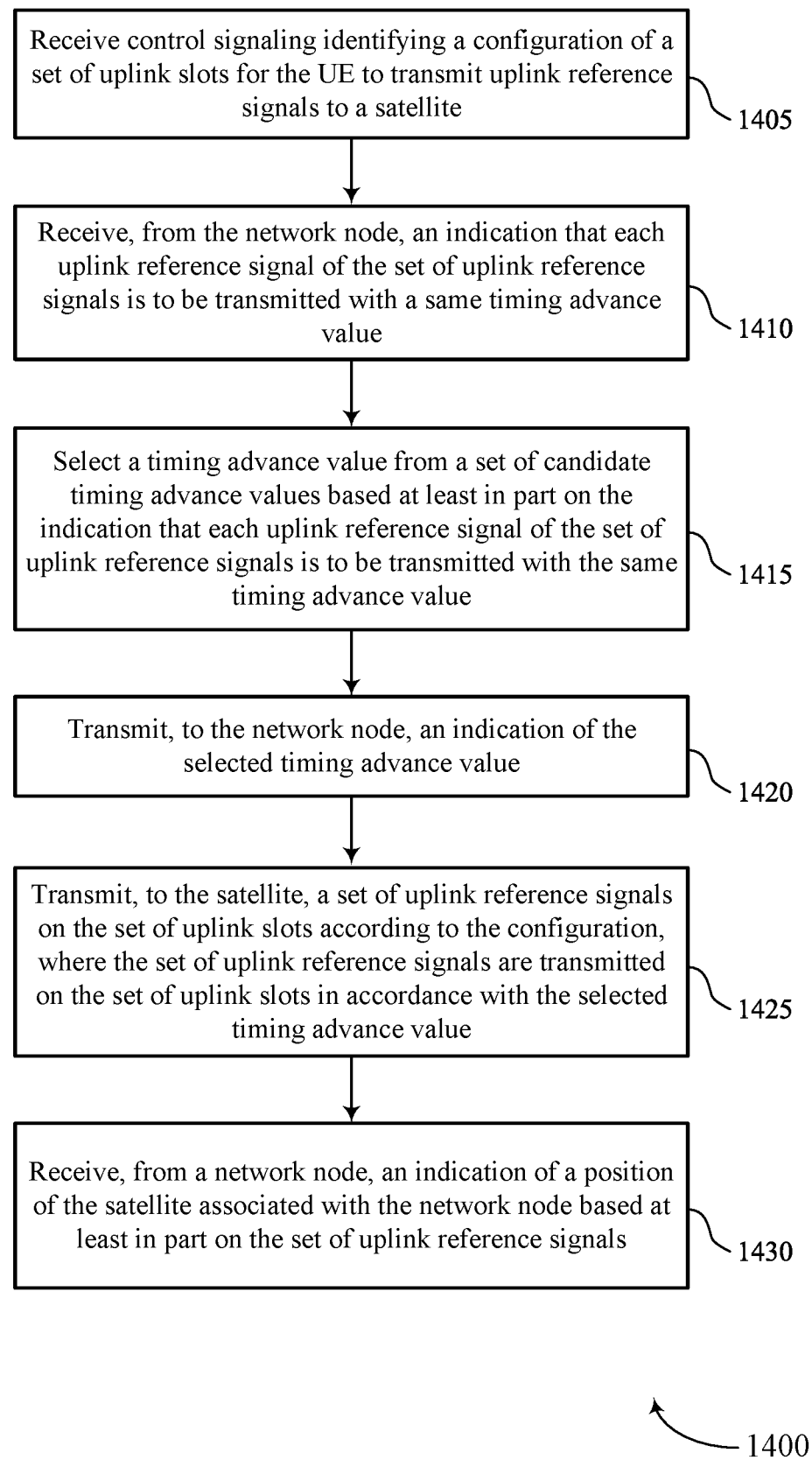

FIG. 14 shows a flowchart illustrating a method 1400 that supports techniques for sequential uplink transmissions-based positioning for NTNs in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving control signaling identifying a configuration of a set of uplink slots for the UE to transmit uplink reference signals to a satellite. The operations of 1405 may be performed in accordance with examples as disclosed herein. In some examples, aspects of the operations of 1405 may be performed by a control signaling receiving manager 725 as described with reference to FIG. 7.

At 1410, the method may include receiving, from the network node, an indication that each uplink reference signal of the set of uplink reference signals is to be transmitted with a same timing advance value. The operations of 1410 may be performed in accordance with examples as disclosed herein. In some examples, aspects of the operations of 1410 may be performed by a timing advance value manager 735 as described with reference to FIG. 7.

At 1415, the method may include selecting a timing advance value from a set of candidate timing advance values based on the indication that each uplink reference signal of the set of uplink reference signals is to be transmitted with the same timing advance value. The operations of 1415 may be performed in accordance with examples as disclosed herein. In some examples, aspects of the operations of 1415 may be performed by a timing advance value manager 735 as described with reference to FIG. 7.

At 1420, the method may include transmitting, to the network node, an indication of the selected timing advance value. The operations of 1420 may be performed in accordance with examples as disclosed herein. In some examples, aspects of the operations of 1420 may be performed by a control signaling transmitting manager 740 as described with reference to FIG. 7.

At 1425, the method may include transmitting, to the satellite, a set of uplink reference signals on the set of uplink slots according to the configuration, where the set of uplink reference signals are transmitted on the set of uplink slots in accordance with the selected timing advance value. The operations of 1425 may be performed in accordance with examples as disclosed herein. In some examples, aspects of the operations of 1425 may be performed by a reference signal transmitting manager 730 as described with reference to FIG. 7.

At 1430, the method may include receiving, from a network node, an indication of a position of the UE based on the set of uplink reference signals. The operations of 1430 may be performed in accordance with examples as disclosed herein. In some examples, aspects of the operations of 1430 may be performed by a control signaling receiving manager 725 as described with reference to FIG. 7.

Figure 15:
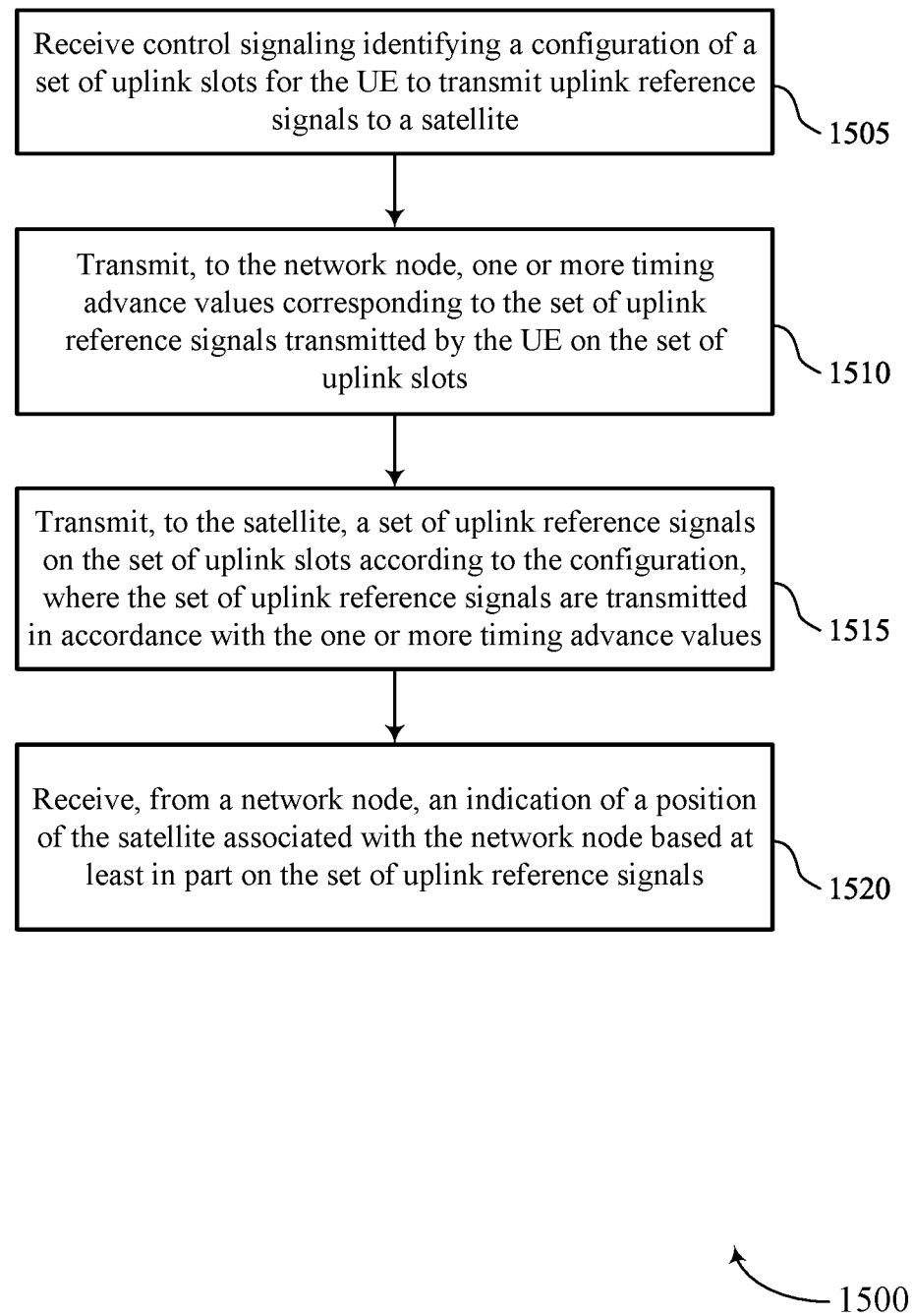

FIG. 15 shows a flowchart illustrating a method 1500 that supports techniques for sequential uplink transmissions-based positioning for NTNs in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1505, the method may include receiving control signaling identifying a configuration of a set of uplink slots for the UE to transmit uplink reference signals to a satellite. The operations of 1505 may be performed in accordance with examples as disclosed herein. In some examples, aspects of the operations of 1505 may be performed by a control signaling receiving manager 725 as described with reference to FIG. 7.

At 1510, the method may include transmitting, to the network node, one or more timing advance values corresponding to the set of uplink reference signals transmitted by the UE on the set of uplink slots. The operations of 1510 may be performed in accordance with examples as disclosed herein. In some examples, aspects of the operations of 1510 may be performed by a timing advance value manager 735 as described with reference to FIG. 7.

At 1515, the method may include transmitting, to the satellite, a set of uplink reference signals on the set of uplink slots according to the configuration, where the set of uplink reference signals are transmitted in accordance with the one or more timing advance values. The operations of 1515 may be performed in accordance with examples as disclosed herein. In some examples, aspects of the operations of 1515 may be performed by a reference signal transmitting manager 730 as described with reference to FIG. 7.

At 1520, the method may include receiving, from a network node, an indication of a position of the UE based on the set of uplink reference signals. The operations of 1520 may be performed in accordance with examples as disclosed herein. In some examples, aspects of the operations of 1520 may be performed by a control signaling receiving manager 725 as described with reference to FIG. 7.

Figure 16:
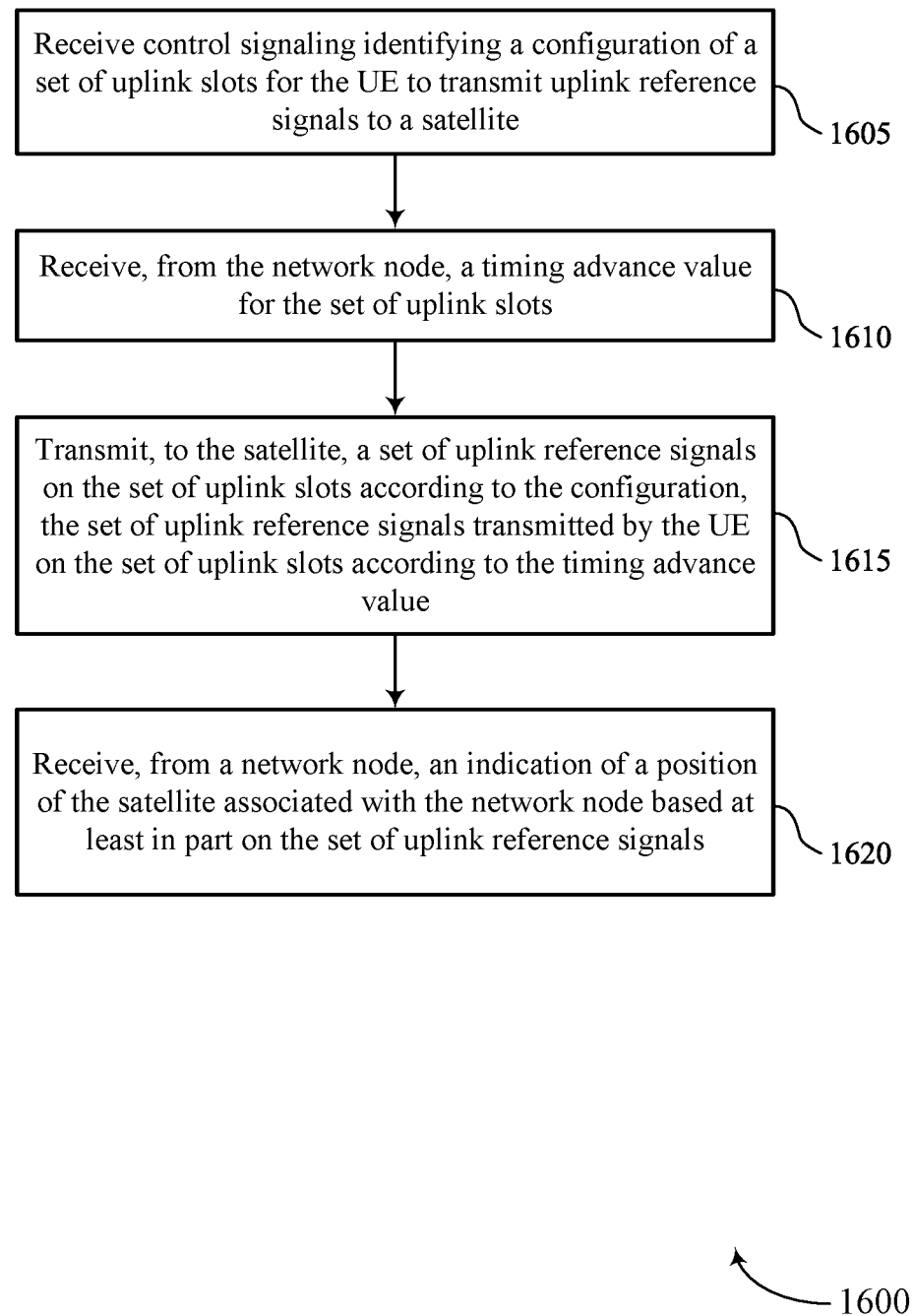

FIG. 16 shows a flowchart illustrating a method 1600 that supports techniques for sequential uplink transmissions-based positioning for NTNs in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1605, the method may include receiving control signaling identifying a configuration of a set of uplink slots for the UE to transmit uplink reference signals to a satellite. The operations of 1605 may be performed in accordance with examples as disclosed herein. In some examples, aspects of the operations of 1605 may be performed by a control signaling receiving manager 725 as described with reference to FIG. 7.

At 1610, the method may include receiving, from the network node, a timing advance value for the set of uplink slots. The operations of 1610 may be performed in accordance with examples as disclosed herein. In some examples, aspects of the operations of 1610 may be performed by a control signaling receiving manager 725 as described with reference to FIG. 7.

At 1615, the method may include transmitting, to the satellite, a set of uplink reference signals on the set of uplink slots according to the configuration, the set of uplink reference signals transmitted by the UE on the set of uplink slots according to the timing advance value. The operations of 1615 may be performed in accordance with examples as disclosed herein. In some examples, aspects of the operations of 1615 may be performed by a reference signal transmitting manager 730 as described with reference to FIG. 7.

At 1620, the method may include receiving, from a network node, an indication of a position of the UE based on the set of uplink reference signals. The operations of 1620 may be performed in accordance with examples as disclosed herein. In some examples, aspects of the operations of 1620 may be performed by a control signaling receiving manager 725 as described with reference to FIG. 7.

Figure 17:
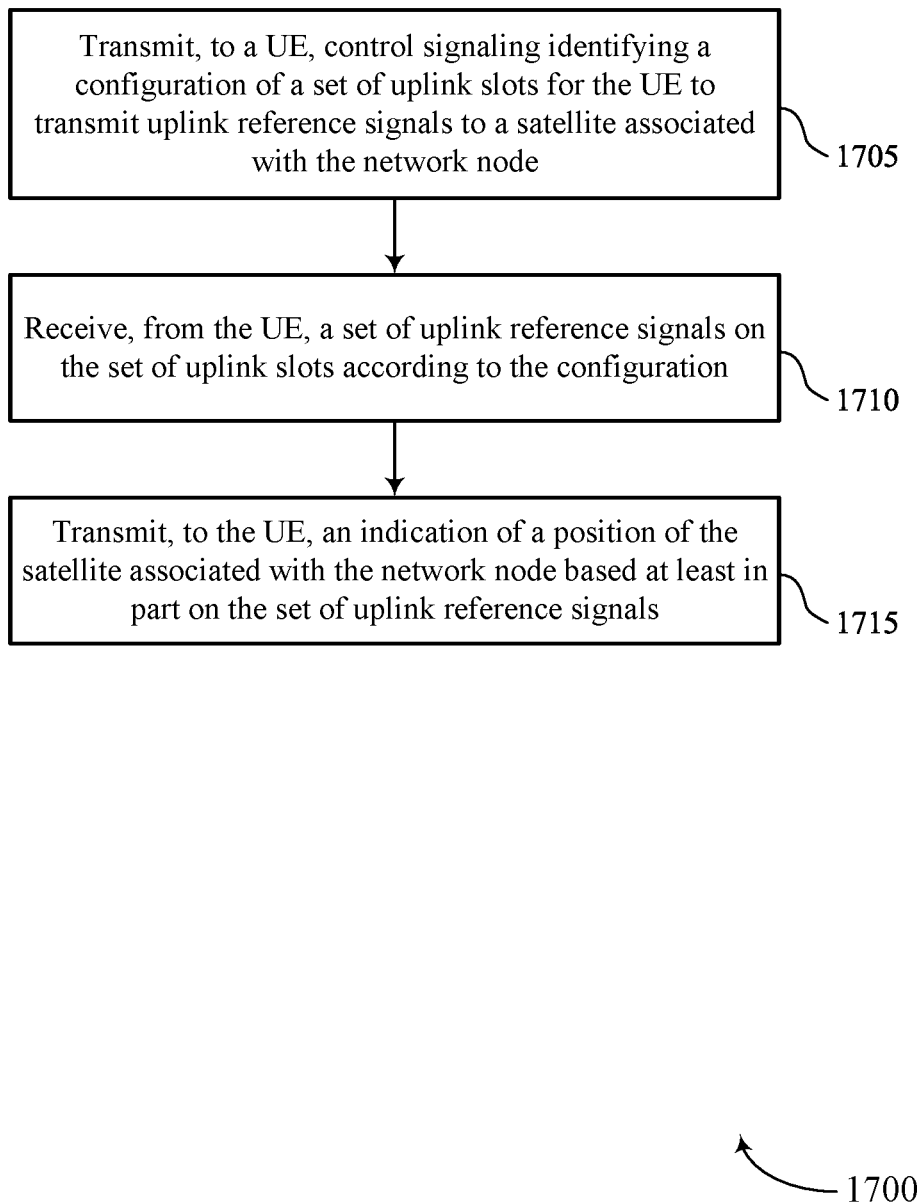

FIG. 17 shows a flowchart illustrating a method 1700 that supports techniques for sequential uplink transmissions-based positioning for NTNs in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1705, the method may include transmitting, to a UE, control signaling identifying a configuration of a set of uplink slots for the UE to transmit uplink reference signals to a satellite associated with the network node. The operations of 1705 may be performed in accordance with examples as disclosed herein. In some examples, aspects of the operations of 1705 may be performed by a control signaling transmitting manager 1125 as described with reference to FIG. 11.

At 1710, the method may include receiving, from the UE, a set of uplink reference signals on the set of uplink slots according to the configuration. The operations of 1710 may be performed in accordance with examples as disclosed herein. In some examples, aspects of the operations of 1710 may be performed by a reference signal receiving manager 1130 as described with reference to FIG. 11.

At 1715, the method may include transmitting, to the UE, an indication of a position of the UE based on the set of uplink reference signals. The operations of 1715 may be performed in accordance with examples as disclosed herein. In some examples, aspects of the operations of 1715 may be performed by a control signaling transmitting manager 1125 as described with reference to FIG. 11.

The following provides an overview of aspects of the present disclosure:

Aspect 1: A method for wireless communication at a UE, comprising: receiving control signaling identifying a configuration of a set of uplink slots for the UE to transmit uplink reference signals to a satellite; transmitting, to the satellite, a set of uplink reference signals on the set of uplink slots according to the configuration; and receiving, from a network node, an indication of a position of the UE based at least in part on the set of uplink reference signals.

Aspect 2: The method of aspect 1, wherein receiving the control signaling identifying the configuration comprises: receiving an indication for each slot of the set of uplink slots or a first indication of a starting slot and a period that identify the set of uplink slots.

Aspect 3: The method of any of aspects 1 through 2, wherein transmitting the set of uplink reference signals comprises: transmitting the set of uplink reference signals on the set of uplink slots according to a set of timing advance values.

Aspect 4: The method of any of aspects 1 through 3, further comprising: receiving, from the network node, an indication that each uplink reference signal of the set of uplink reference signals is to be transmitted with a same timing advance value, where the set of uplink reference signals are transmitted on the set of uplink slots in accordance with the same timing advance value.

Aspect 5: The method of aspect 4, further comprising: selecting a timing advance value from a set of candidate timing advance values based at least in part on the indication that each uplink reference signal of the set of uplink reference signals is to be transmitted with the same timing advance value; and transmitting, to the network node, an indication of the selected timing advance value, where the set of uplink reference signals are transmitted on the set of uplink slots in accordance with the selected timing advance value.

Aspect 6: The method of any of aspects 1 through 5, further comprising: transmitting, to the network node, one or more timing advance values corresponding to the set of uplink reference signals transmitted by the UE on the set of uplink slots.

Aspect 7: The method of aspect 6, wherein transmitting the one or more timing advance values comprises: transmitting an aggregated timing advance value generated from a plurality of timing advance values for the set of uplink reference signals.

Aspect 8: The method of any of aspects 6 through 7, wherein the one or more timing advance values include at least a first one or more timing advance values and a second one or more timing advance values, wherein transmitting the one or more timing advance values comprises: transmitting a first message that includes an indication of the first one or more timing advance values; and transmitting a second message that includes an indication of the second one or more timing advance values.

Aspect 9: The method of any of aspects 6 through 8, wherein the one or more timing advance values include a plurality of timing advance values, and transmitting the one or more timing advance values comprises: transmitting a timing advance value selected from the plurality of timing advance values.

Aspect 10: The method of any of aspects 1 through 9, further comprising: receiving, from the network node, a timing advance value for the set of uplink slots, the set of uplink reference signals transmitted by the UE on the set of uplink slots according to the timing advance value.

Aspect 11: The method of aspect 10, wherein the timing advance value comprises a time interval prior to a TTI at the UE, a time interval following a TTI at the UE, or both.

Aspect 12: The method of any of aspects 10 through 11, wherein the timing advance value is associated with a plurality of UEs in a cell served by the network node, a beam of the network node, or any combination thereof.

Aspect 13: The method of any of aspects 10 through 12, wherein the timing advance value is associated with a first set of UEs served by the network node, including the UE, and a second timing advance value is associated with a second set of UEs served by the network node.

Aspect 14: The method of any of aspects 1 through 13, wherein receiving the control signaling identifying the configuration of the set of uplink slots comprises: receiving an indication of the set of uplink slots in a system information message, RRC signaling, a media access control-control element message, a downlink control information message, or any combination thereof.

Aspect 15: The method of any of aspects 1 through 14, wherein the set of uplink reference signals comprise SRSs, PRSs, or any combination thereof.

Aspect 16: A method for wireless communication at a network node, comprising: transmitting, to a UE, control signaling identifying a configuration of a set of uplink slots for the UE to transmit uplink reference signals to a satellite associated with the network node; receiving, from the UE, a set of uplink reference signals on the set of uplink slots according to the configuration; and transmitting, to the UE, an indication of a position of the UE based at least in part on the set of uplink reference signals.

Aspect 17: The method of aspect 16, wherein transmitting the control signaling identifying the configuration comprises: transmitting an indication for each slot of the set of uplink slots or a first indication of a starting slot and a period that identify the set of uplink slots.

Aspect 18: The method of any of aspects 16 through 17, wherein receiving the set of uplink reference signals comprises: receiving the set of uplink reference signals on the set of uplink slots according to a set of timing advance values.

Aspect 19: The method of any of aspects 16 through 18, further comprising: transmitting, to the UE, an indication that each uplink reference signal of the set of uplink reference signals is to be transmitted with a same timing advance value, where the set of uplink reference signals are transmitted on the set of uplink slots in accordance with the same timing advance value.

Aspect 20: The method of aspect 19, further comprising: receiving, from the UE and based at least in part on the indication that each uplink reference signal of the set of uplink reference signals is to be transmitted with the same timing advance value, an indication of a selected timing advance value, where the set of uplink reference signals are received on the set of uplink slots in accordance with the selected timing advance value.

Aspect 21: The method of any of aspects 16 through 20, further comprising: receiving, from the UE, one or more timing advance values corresponding to the set of uplink reference signals transmitted by the UE on the set of uplink slots.

Aspect 22: The method of any of aspects 16 through 21, further comprising: transmitting, to the UE, a timing advance value for the set of uplink slots, the set of uplink reference signals transmitted by the UE on the set of uplink slots according to the timing advance value.

Aspect 23: An apparatus for wireless communication at a UE, comprising a processor; memory coupled with the processor; and instructions stored in the memory and executable by the processor to cause the apparatus to perform a method of any of aspects 1 through 15.

Aspect 24: An apparatus for wireless communication at a UE, comprising at least one means for performing a method of any of aspects 1 through 15.

Aspect 25: A non-transitory computer-readable medium storing code for wireless communication at a UE, the code comprising instructions executable by a processor to perform a method of any of aspects 1 through 15.

Aspect 26: An apparatus for wireless communication at a network node, comprising a processor; memory coupled with the processor; and instructions stored in the memory and executable by the processor to cause the apparatus to perform a method of any of aspects 16 through 22.

Aspect 27: An apparatus for wireless communication at a network node, comprising at least one means for performing a method of any of aspects 16 through 22.

Aspect 28: A non-transitory computer-readable medium storing code for wireless communication at a network node, the code comprising instructions executable by a processor to perform a method of any of aspects 16 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving control signaling identifying a configuration of a set of uplink slots for the UE to transmit uplink reference signals to a satellite;
   receiving, from a network node, a timing advance value for the set of uplink slots;
   transmitting, to the satellite, a set of uplink reference signals on the set of uplink slots according to the configuration and according to the timing advance value; and
   receiving, from the network node, an indication of a position of the UE based at least in part on the set of uplink reference signals.

2. The method of claim 1, wherein receiving the control signaling identifying the configuration comprises:
   receiving an indication for each slot of the set of uplink slots or a first indication of a starting slot and a period that identify the set of uplink slots.

3. The method of claim 1, wherein transmitting the set of uplink reference signals comprises:
   transmitting the set of uplink reference signals on the set of uplink slots according to a set of timing advance values comprising at least the timing advance value.

4. The method of claim 1, further comprising:
   receiving, from the network node, an indication that each uplink reference signal of the set of uplink reference signals is to be transmitted with the timing advance value, where the set of uplink reference signals are transmitted on the set of uplink slots in accordance with the timing advance value.

5. The method of claim 4, further comprising:
   selecting the timing advance value from a set of candidate timing advance values based at least in part on the indication that each uplink reference signal of the set of uplink reference signals is to be transmitted with the timing advance value; and
   transmitting, to the network node, an indication of the selected timing advance value, where the set of uplink reference signals are transmitted on the set of uplink slots in accordance with the selected timing advance value.

6. The method of claim 1, further comprising:
   transmitting, to the network node, one or more timing advance values corresponding to the set of uplink reference signals transmitted by the UE on the set of uplink slots, the one or more timing advance values comprising at least the timing advance value.

7. The method of claim 6, wherein transmitting the one or more timing advance values comprises:
   transmitting an aggregated timing advance value generated from a plurality of timing advance values for the set of uplink reference signals, the plurality of timing advance values comprising the timing advance value.

8. The method of claim 6, wherein the one or more timing advance values include at least a first one or more timing advance values and a second one or more timing advance values, wherein transmitting the one or more timing advance values comprises:
   transmitting a first message that includes an indication of the first one or more timing advance values; and
   transmitting a second message that includes an indication of the second one or more timing advance values.

9. The method of claim 6, wherein the one or more timing advance values include a plurality of timing advance values, and transmitting the one or more timing advance values comprises:
   transmitting the timing advance value selected from the plurality of timing advance values.

10. The method of claim 1, wherein the timing advance value comprises a time interval prior to a transmission time interval at the UE, a time interval following a transmission time interval at the UE, or both.

11. The method of claim 1, wherein the timing advance value is associated with a plurality of UEs in a cell served by the network node, a beam of the network node, or any combination thereof.

12. The method of claim 1, wherein the timing advance value is associated with a first set of UEs served by the network node, including the UE, and a second timing advance value is associated with a second set of UEs served by the network node.

13. The method of claim 1, wherein receiving the control signaling identifying the configuration of the set of uplink slots comprises:
   receiving an indication of the set of uplink slots in a system information message, radio resource control signaling, a media access control-control element message, a downlink control information message, or any combination thereof.

14. The method of claim 1, wherein the set of uplink reference signals comprise sounding reference signals, positioning reference signals, or any combination thereof.

15. A method for wireless communication at a network node, comprising:
   transmitting, to a user equipment (UE), control signaling identifying a configuration of a set of uplink slots for the UE to transmit uplink reference signals to a satellite associated with the network node;
   transmitting, to the UE, a timing advance value for the set of uplink slots;
   receiving, from the UE, a set of uplink reference signals on the set of uplink slots according to the configuration and according to the timing advance value; and
   transmitting, to the UE, an indication of a position of the UE based at least in part on the set of uplink reference signals.

16. The method of claim 15, wherein transmitting the control signaling identifying the configuration comprises:
   transmitting an indication for each slot of the set of uplink slots or a first indication of a starting slot and a period that identify the set of uplink slots.

17. The method of claim 15, wherein receiving the set of uplink reference signals comprises:
   receiving the set of uplink reference signals on the set of uplink slots according to a set of timing advance values comprising at least the timing advance value.

18. The method of claim 15, further comprising:
   transmitting, to the UE, an indication that each uplink reference signal of the set of uplink reference signals is to be transmitted with the timing advance value, where the set of uplink reference signals are transmitted on the set of uplink slots in accordance with the timing advance value.

19. The method of claim 18, further comprising:
receiving, from the UE and based at least in part on the indication that each uplink reference signal of the set of uplink reference signals is to be transmitted with the timing advance value, an indication of the timing advance value, where the set of uplink reference signals are received on the set of uplink slots in accordance with the timing advance value.

20. The method of claim 15, further comprising:
receiving, from the UE, one or more timing advance values corresponding to the set of uplink reference signals transmitted by the UE on the set of uplink slots, the one or more timing advance values comprising at least the timing advance value.

21. An apparatus for wireless communication at a user equipment (UE), comprising:
at least one processor;
at least one memory coupled with the at least one processor; and
instructions stored in the at least one memory and executable by the at least one processor to cause the apparatus to:
receive control signaling identifying a configuration of a set of uplink slots for the UE to transmit uplink reference signals to a satellite;
receive, from a network node, a timing advance value for the set of uplink slots;
transmit, to the satellite, a set of uplink reference signals on the set of uplink slots according to the configuration and according to the timing advance value; and
receive, from the network node, an indication of a position of the UE based at least in part on the set of uplink reference signals.

22. The apparatus of claim 21, wherein the instructions to receive the control signaling identifying the configuration are executable by the at least one processor to cause the apparatus to:
receive an indication for each slot of the set of uplink slots or a first indication of a starting slot and a period that identify the set of uplink slots.

23. The apparatus of claim 21, wherein the instructions to transmit the set of uplink reference signals are executable by the at least one processor to cause the apparatus to:
transmit the set of uplink reference signals on the set of uplink slots according to a set of timing advance values comprising at least the timing advance value.

24. The apparatus of claim 21, wherein the instructions are further executable by the at least one processor to cause the apparatus to:
receive, from the network node, an indication that each uplink reference signal of the set of uplink reference signals is to be transmitted with the timing advance value, where the set of uplink reference signals are transmitted on the set of uplink slots in accordance with the timing advance value.

25. The apparatus of claim 24, wherein the instructions are further executable by the at least one processor to cause the apparatus to:
select the timing advance value from a set of candidate timing advance values based at least in part on the indication that each uplink reference signal of the set of uplink reference signals is to be transmitted with the timing advance value; and
transmit, to the network node, an indication of the selected timing advance value, where the set of uplink reference signals are transmitted on the set of uplink slots in accordance with the selected timing advance value.

26. An apparatus for wireless communication at a network node, comprising:
at least one processor;
at least one memory coupled with the at least one processor; and
instructions stored in the at least one memory and executable by the at least one processor to cause the apparatus to:
transmit, to a user equipment (UE), control signaling identifying a configuration of a set of uplink slots for the UE to transmit uplink reference signals to a satellite associated with the network node;
transmit, to the UE, a timing advance value for the set of uplink slots;
receive, from the UE, a set of uplink reference signals on the set of uplink slots according to the configuration and according to the timing advance value; and
transmit, to the UE, an indication of a position of the UE based at least in part on the set of uplink reference signals.

27. The apparatus of claim 26, wherein the instructions to transmit the control signaling identifying the configuration are executable by the at least one processor to cause the apparatus to:
transmit an indication for each slot of the set of uplink slots or a first indication of a starting slot and a period that identify the set of uplink slots.

28. The apparatus of claim 26, wherein the instructions to receive the set of uplink reference signals are executable by the at least one processor to cause the apparatus to:
receive the set of uplink reference signals on the set of uplink slots according to a set of timing advance values comprising at least the timing advance value.

* * * * *